United States Patent
Du et al.

(10) Patent No.: US 12,001,494 B2
(45) Date of Patent: Jun. 4, 2024

(54) CONTENT PROCESSING METHOD AND APPARATUS, COMPUTER-READABLE STORAGE MEDIUM AND COMPUTER DEVICE

(71) Applicant: TENCENT TECHNOLOGY (SHENZHEN) COMPANY LTD, Guangdong (CN)

(72) Inventors: Lihuan Du, Shenzhen (CN); Yalong Wang, Shenzhen (CN); Rui Wang, Shenzhen (CN); Feng Xia, Shenzhen (CN); Leyu Lin, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 168 days.

(21) Appl. No.: 17/692,368

(22) Filed: Mar. 11, 2022

(65) Prior Publication Data
US 2022/0197964 A1    Jun. 23, 2022

Related U.S. Application Data

(63) Continuation of application No. PCT/CN2020/127720, filed on Nov. 10, 2020.

(30) Foreign Application Priority Data

Feb. 13, 2020 (CN) .......................... 202010091435.7

(51) Int. Cl.
*G06F 16/00* (2019.01)
*G06F 16/9535* (2019.01)

(52) U.S. Cl.
CPC ................. *G06F 16/9535* (2019.01)

(58) Field of Classification Search
CPC ............. G06F 11/1451; G06F 11/1461; G06F 11/3034; G06F 11/1453; G06F 11/3485;
(Continued)

(56) References Cited

U.S. PATENT DOCUMENTS 9,112,923 B1 *   8/2015   Kalmanek, Jr. ......... H04L 63/30
2014/0280101 A1   9/2014   Stipins, III
2015/0012378 A1   1/2015   Herbrich et al.

FOREIGN PATENT DOCUMENTS

CN    106649774 A    5/2017
CN    109242633 A    1/2019
(Continued)

OTHER PUBLICATIONS

International Search Report for PCT/CN2020/127720 dated, Feb. 10, 2021 (PCT/ISA/210).
(Continued)

*Primary Examiner* — Yicun Wu
(74) *Attorney, Agent, or Firm* — Sughrue Mion, PLLC

(57) ABSTRACT

Embodiments of the present disclosure relate to a content processing method and apparatus, a computer-readable storage medium, and a computer device. The method includes obtaining data of a to-be-pushed user in behavior evaluation dimensions, user portrait information of the to-be-pushed user, and to-be-pushed content, with the user portrait information corresponding to a user portrait code and the to-be-pushed content corresponding to a to-be-pushed content code. The method further includes determining a user behavior code based on the data of the to-be-pushed user in the behavior evaluation dimensions, and obtaining a target code by fusing the to-be-pushed content code with the user behavior code and the user portrait code. Then, the method includes determining a recommendation probability of the (Continued)

to-be-pushed content based on the target code to determine the push content based on the recommendation probability.

20 Claims, 12 Drawing Sheets

(58) Field of Classification Search
CPC ............ G06F 2201/88; G06F 2201/80; G06F 2201/81; G06F 16/1787; G06F 16/178; G06F 16/116; G06F 16/24578; G06F 16/1734; G06F 16/168; G06F 11/1464; G06F 16/27; G06F 16/122; G06F 16/113; G06F 16/16; G06F 16/182; G06F 8/44; G06F 9/54; G06F 11/1469; G06Q 30/0633; G06Q 30/0203; G06Q 30/02; H04L 69/04; H04L 63/0853; H04L 41/0816; H04L 67/06; H04L 47/70; H04L 67/1097; H04L 67/10; H04L 47/78; H04L 67/306; H04L 67/535; H04L 67/1095; H04W 12/06

See application file for complete search history.

(56) References Cited

FOREIGN PATENT DOCUMENTS

| CN | 109450862 A | 3/2019 |
| CN | 110162701 A | 8/2019 |
| CN | 110263243 A | 9/2019 |
| CN | 111259256 A | 6/2020 |

OTHER PUBLICATIONS

Written Opinion of the International Searching Authority for PCT/CN2020/127720 dated, Feb. 10, 2022 (PCT/ISA/237).

* cited by examiner

CONTENT PROCESSING METHOD AND APPARATUS, COMPUTER-READABLE STORAGE MEDIUM AND COMPUTER DEVICE

CROSS-REFERENCE TO RELATED APPLICATIONS

This application is a continuation application of International Application No. PCT/CN2020/127720, filed Nov. 10, 2020, which claims priority to Chinese Patent Application No. 202010091435.7, filed with the China National Intellectual Property Administration on Feb. 13, 2020, the disclosures of which are incorporated by reference in their entireties.

FIELD

Embodiments of the present disclosure relate to the field of data technologies, and in particular, to a content processing method and apparatus, a computer-readable storage medium, and a computer device.

BACKGROUND

With the development of computer technologies, various applications for browsing the content emerge one after another. More and more users choose to browse content such as news and entertainment information through applications. In such a situation, some push content is pushed to corresponding applications based on requests of users.

In the current method for determining push content, content with a relatively high similarity with content already read by a user is generally determined as the push content through calculating the similarity between the contents to be pushed and the content already read by the user. However, a lot of information is lost in the process of determining the push content because using each piece of content as a separate piece of data, and relying only on the content results in relatively low accuracy when determining push content.

SUMMARY

According to embodiments provided in the present disclosure, a content processing method and apparatus, a computer-readable storage medium, and a computer device are provided.

According to embodiments of the present disclosure, a content processing method is provided, performed by a computer device, the method including: obtaining data of a to-be-pushed user in behavior evaluation dimensions, user portrait information of the to-be-pushed user, and to-be-pushed content, wherein the user portrait information matches a corresponding user portrait code, and the to-be-pushed content matches a corresponding to-be-pushed content code; determining a user behavior code of the to-be-pushed user in the behavior evaluation dimensions based on the data of the to-be-pushed user in the behavior evaluation dimensions; fusing the to-be-pushed content code with the user behavior code and the user portrait code to obtain a target code; determining a recommendation probability of the to-be-pushed content based on the target code; and determining push content corresponding to the to-be-pushed user from the to-be-pushed content based on the recommendation probability.

According to embodiments of the present disclosure, a content processing apparatus is provided, the apparatus including: at least one memory configured to store program code; and at least one processor configured to read the program code and operate as instructed by the program code, the program code comprising: first obtaining code configured to cause the at least one processor to obtain data of a to-be-pushed user in behavior evaluation dimensions, user portrait information of the to-be-pushed user, and to-be-pushed content, the user portrait information matching a corresponding user portrait code, and the to-be-pushed content matching a corresponding to-be-pushed content code; first determining code configured to cause the at least one processor to determine a user behavior code of the to-be-pushed user in the behavior evaluation dimensions based on the data of the to-be-pushed user in the behavior evaluation dimensions; first fusing code configured to cause the at least one processor to fuse the to-be-pushed content code with the user behavior code and the user portrait code to obtain a target code; second determining code configured to cause the at least one processor to determine a recommendation probability of the to-be-pushed content based on the target code; and third determining code configured to cause the at least one processor to determine push content corresponding to the to-be-pushed user from the to-be-pushed content base on the recommendation probability.

According to an embodiment of the present disclosure, non-transitory computer-readable storage medium is provided. The non-transitory computer readable storage medium stores at least one instruction executable by a processor to: obtain data of a to-be-pushed user in behavior evaluation dimensions, user portrait information of the to-be-pushed user, and to-be-pushed content, wherein the user portrait information matches a corresponding user portrait code, and the to-be-pushed content matches a corresponding to-be-pushed content code; determine a user behavior code of the to-be-pushed user in the behavior evaluation dimensions based on the data of the to-be-pushed user in the behavior evaluation dimensions; fuse the to-be-pushed content code with the user behavior code and the user portrait code to obtain a target code; determine a recommendation probability of the to-be-pushed content based on the target code; and determine push content corresponding to the to-be-pushed user from the to-be-pushed content based on the recommendation probability. Details of one or more embodiments of the present disclosure are provided in the accompanying drawings and descriptions below. Other features, objectives, and advantages of the present disclosure become apparent from the specification, the accompanying drawings, and the claims.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the present disclosure in detail with reference to the accompanying drawings and the embodiments. It is to be understood that the specific embodiments described herein are merely used for explaining the present disclosure but are not intended to limit the present disclosure.

Figure 1:
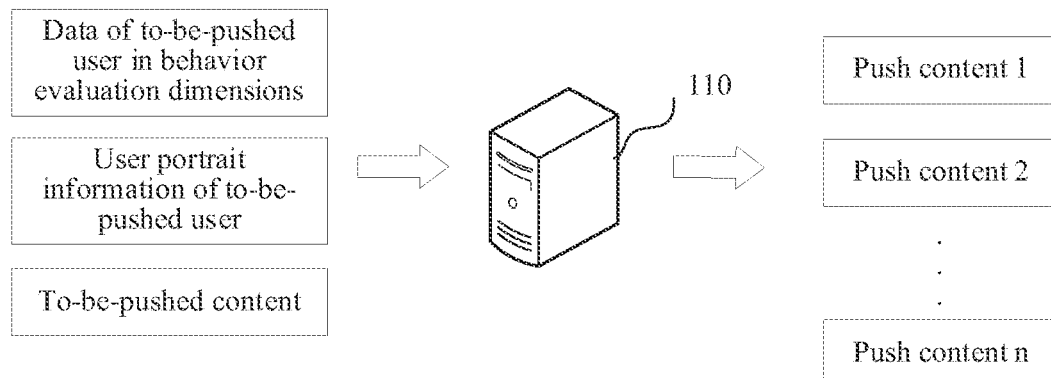
FIG. 1 is a diagram of an application environment of a content processing method according to an example embodiment.

FIG. 1 is a diagram of an application environment of a content processing method according to an embodiment. Referring to FIG. 1, the diagram of the application environment includes a server 110. The server 110 obtains data of a to-be-pushed user in behavior evaluation dimensions, user portrait information of the to-be-pushed user, and to-be-pushed content in advance, for example, data of a user A in the behavior evaluation dimensions, user portrait information of the user A, and to-be-pushed content, the user portrait information matching a corresponding user portrait code, and the to-be-pushed content matching a corresponding to-be-pushed content code. The server 110 may determine a user behavior code of the to-be-pushed user in the behavior evaluation dimensions based on the data of the to-be-pushed user in the behavior evaluation dimensions. In some embodiments, the server 110 may fuse the to-be-pushed content code with the user behavior code and the user portrait code to obtain a target code. The server 110 may determine a recommendation probability of the to-be-pushed content based on the target code. The server 110 may then determine push content corresponding to the to-be-pushed user such as push content 1 and push content 2 from the to-be-pushed content based on the recommendation probability. In addition, the server 110 may further push the push content corresponding to the to-be-pushed user to a corresponding user terminal based on a content push request of the user terminal of the to-be-pushed user for the to-be-pushed user to view.

Figure 2:
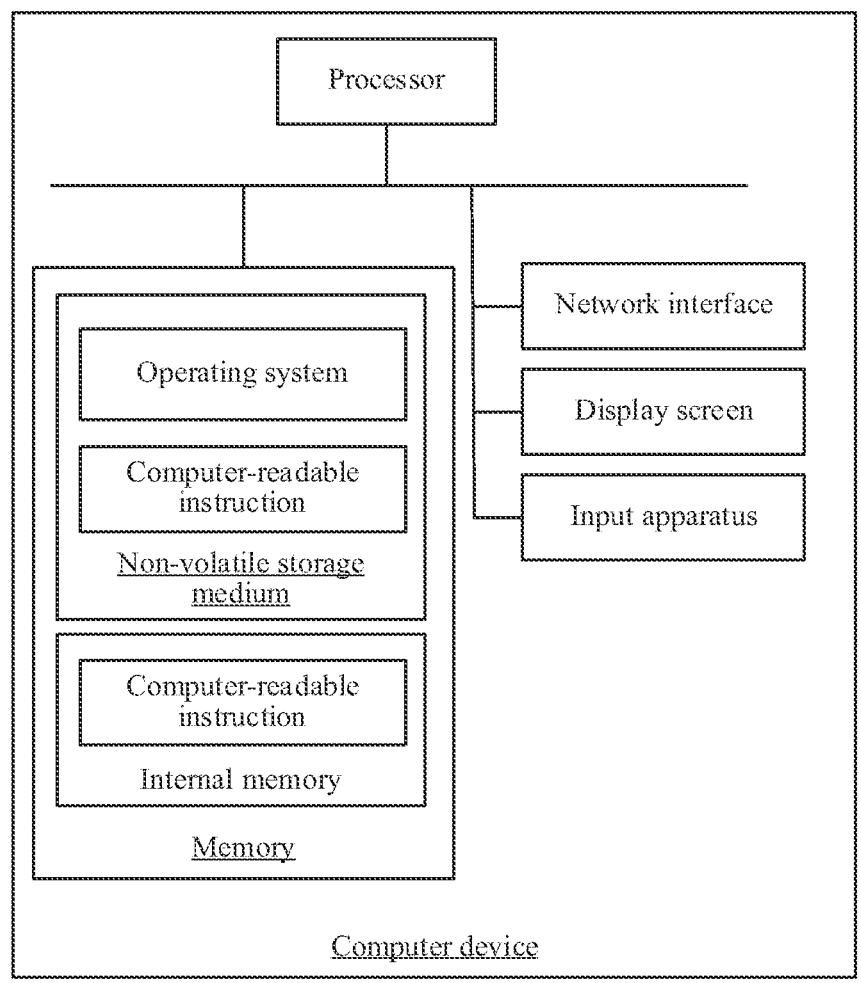
FIG. 2 is a structural block diagram of a computer device according to an example embodiment.

FIG. 2 is a diagram of an internal structure of a computer device according to an embodiment. The computer device may be specifically the server 110 in FIG. 1. As shown in FIG. 2, the computer device includes a processor, a memory, a network interface, an input apparatus, and a display that are connected through a system bus. The memory includes a non-volatile storage medium and an internal memory. The non-volatile storage medium of the computer device stores an operating system and computer-readable instructions that when executed by the processor, cause the processor to implement a content processing method. The internal memory may also store computer-readable instructions that when executed by the processor, cause the processor to perform the content processing method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art may understand that, the structure shown in FIG. 2 is only a block diagram of a part of a structure related to a solution of the present disclosure and does not limit the computer device to which the solution of the present disclosure is applied. Specifically, the computer device may include more or fewer members than those in the drawings, or include a combination of some members, or include different member layouts.

Figure 3:
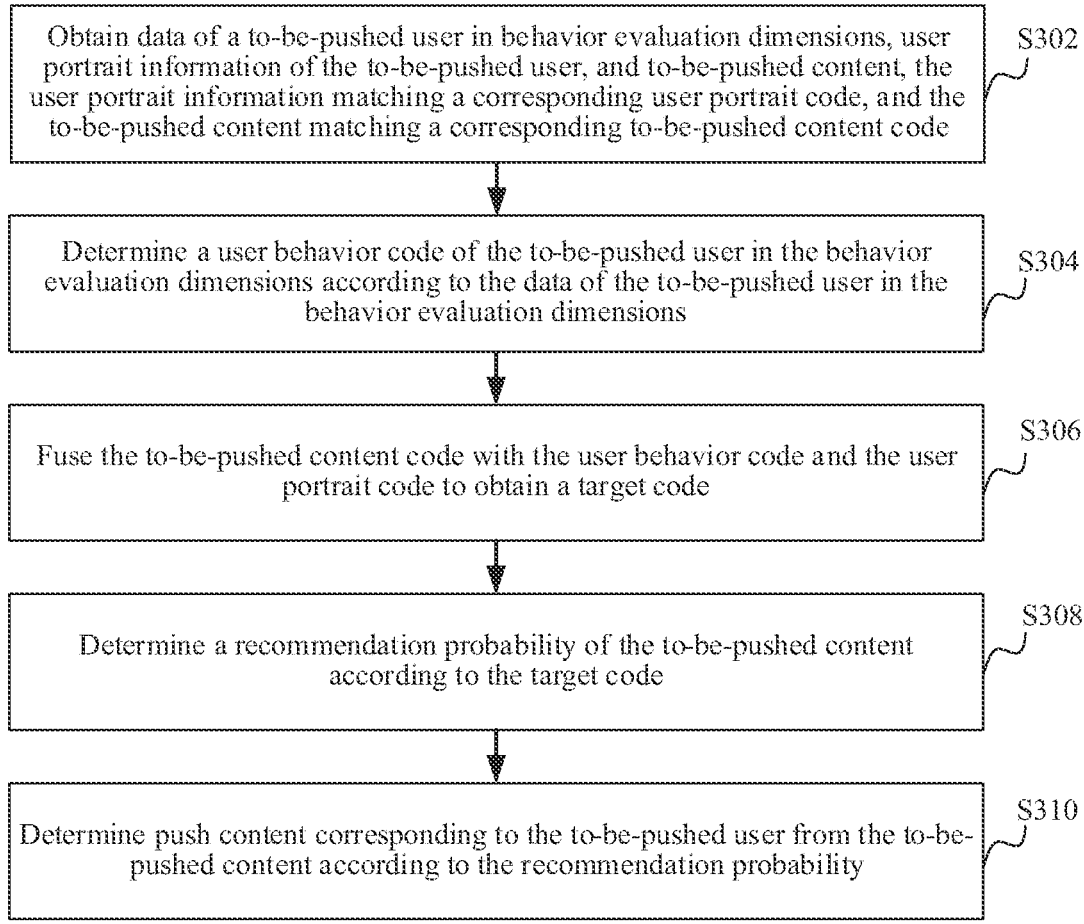
FIG. 3 is a schematic flowchart of a content processing method according to an example embodiment.

As shown in FIG. 3, in an embodiment, a content processing method is provided. This embodiment is mainly described by using an example in which the method is applied to the server 110 in FIG. 1. Referring to FIG. 3, the content processing method specifically includes the following operations:

S302: Obtain data of a to-be-pushed user in behavior evaluation dimensions, user portrait information of the to-be-pushed user, and to-be-pushed content, the user portrait information matching a corresponding user portrait code, and the to-be-pushed content matching a corresponding to-be-pushed content code.

The behavior evaluation dimension refers to an evaluation perspective used for representing an operation behavior of the user. For example, the behavior evaluation dimension may be specifically a user-content operation perspective, a user-content publishing object association perspective, or a content publishing object-content operation perspective. The user-content operation perspective is used for describing a relationship between the user and content, such as a user-content click relationship, a user-content like relationship, a user-content comment relationship, or a user-content forwarding relationship. The user-content publishing object association perspective is used for describing a relationship between the user and a content publishing object (such as an article author or a WeChat official account), for example, a user-content publishing object following relationship. The content publishing object-content operation perspective is used for describing a relationship between a content publishing object and content, for example, a content publishing object-content publishing relationship. The data refers to data of the to-be-pushed user in various behavior evaluation dimensions in the current period of time such as the recent few days. For example, data of the to-be-pushed user from the user-content operation perspective refers to a relationship between the to-be-pushed user and content, for example, the to-be-pushed user has clicked on the content or the to-be-pushed user has liked the content.

According to embodiments of the present disclosure, behavior evaluation dimension may include, but not be limited to, the user-content operation perspective, the user-content publishing object association perspective, and the content publishing object-content operation perspective.

The user portrait information refers to user preference description information abstracted according to basic information of the to-be-pushed user such as interests, hobbies, occupation, and age, and may be used for representing the preference degree of the to-be-pushed user for content categories.

The to-be-pushed content refers to preselected content pushed to the to-be-pushed user, and specifically refers to the latest content, such as the content in the recent few days. In actual scenarios, the to-be-pushed content may refer to graphic information, video information, picture information, or article information. It is to be understood that the to-be-pushed content is merely a plurality of pieces of preliminarily determined content, and may not be the content that is finally pushed to the to-be-pushed user. The content finally pushed to the to-be-pushed user may be determined according to a recommendation probability obtained subsequently.

The user portrait information code refers to a low-dimensional feature vector compressed and encoded to represent low-level semantics of the user portrait information. The to-be-pushed content code refers to a low-dimensional feature vector compressed and encoded to represent low-level semantics of the to-be-pushed content. Both the user portrait information code and the to-be-pushed content code are extracted by a feature extraction network in a pre-trained content recommendation model.

Specifically, the server acquires historical operation data of the to-be-pushed user, the user portrait information, and content on the network based on the big data technology, and identifies the content on the network as the to-be-pushed content; obtains the behavior evaluation dimensions, performs statistical analysis on the historical operation data of the to-be-pushed user according to the behavior evaluation dimensions, and obtains the data of the to-be-pushed user in the behavior evaluation dimensions; queries a matching relationship between the user portrait information and the user portrait code according to the user portrait information, and obtains the user portrait code corresponding to the user portrait information; and queries a matching relationship between the to-be-pushed content and the to-be-pushed content code according to the to-be-pushed content, and obtains the to-be-pushed content code corresponding to the to-be-pushed content.

In an embodiment, the server may further acquire a plurality of pieces of user portrait information of the to-be-pushed user and a plurality of pieces of to-be-pushed content, and input the plurality of pieces of user portrait information of the to-be-pushed users and the plurality of pieces of to-be-pushed content into the feature extraction network of the pre-trained content recommendation model respectively, to obtain user portrait codes corresponding to the plurality of pieces of user portrait information, and to-be-pushed content codes corresponding to the plurality of pieces of to-be-pushed content; construct matching relationships between the plurality of pieces of user portrait information and the user portrait codes based on the user portrait codes corresponding to the user portrait information; and construct matching relationships between the plurality of pieces of to-be-pushed content and the to-be-pushed content codes based on the to-be-pushed content codes corresponding to the to-be-pushed content.

S304: Determine a user behavior code of the to-be-pushed user in the behavior evaluation dimensions based on the data of the to-be-pushed user in the behavior evaluation dimensions.

The user behavior code refers to a feature vector used for representing a user time-order feature and a user behavior feature of the to-be-pushed user. The user time-order feature refers to the content on which the to-be-pushed user operates in sequence, for example, the to-be-pushed user reads several articles in sequence. The user behavior feature refers to an operation behavior of the to-be-pushed user on content or a content publishing object, such as which article the to-be-pushed user likes or which WeChat official account the to-be-pushed user follows.

Specifically, the server constructs a behavior graph network of the to-be-pushed user according to the data of the to-be-pushed user in the behavior evaluation dimensions; and inputs data in the behavior graph network of the to-be-pushed user into a pre-trained information embedding network model to obtain the user behavior code of the to-be-pushed user in the behavior evaluation dimensions. The pre-trained information embedding network model is a feature embedding model that may obtain the user behavior code of the to-be-pushed user in the behavior evaluation dimensions based on the data in the behavior graph network of the to-be-pushed user.

For example, the server constructs the behavior graph network of the to-be-pushed user based on a graph network construction technology based on the data of the to-be-pushed user in the behavior evaluation dimensions. The user behavior code of the to-be-pushed user in the behavior evaluation dimensions is learned based on the data in the behavior graph network of the to-be-pushed user through a graph embedding algorithm such as Deepwalk, Graphsage, or Pinsage.

S306: Fuse the to-be-pushed content code with the user behavior code and the user portrait code to obtain a target code.

The target code refers to a feature vector formed by fusing the to-be-pushed content code, the user behavior code, and the user portrait code, and specifically refers to a feature vector formed by concatenating the to-be-pushed content code, the user behavior code, and the user portrait code, and is used for representing a recommendation probability of the to-be-pushed content.

Specifically, the server concatenates each to-be-pushed content code with the user behavior code and the user portrait code by column in a preset concatenating sequence to obtain the target code, to help subsequently determine the recommendation probability of the to-be-pushed content based on the target code. In addition, the data of the to-be-pushed user in the behavior evaluation dimensions, the user portrait information, and the to-be-pushed content are comprehensively considered, which helps to comprehensively and accurately describe the relationship between the to-be-pushed user and the content, and helps to accurately determine the push content of the to-be-pushed user subsequently.

For example, the server concatenates the to-be-pushed content code with the user behavior code and the user portrait code by column in a sequence of the to-be-pushed content code—the user behavior code—the user portrait code to obtain the target code.

S308: Determine a recommendation probability of the to-be-pushed content based on the target code.

The recommendation probability of the to-be-pushed content is used for measuring a possibility of the to-be-pushed content being recommended, and specifically refers to a probability that the to-be-pushed content is clicked by the to-be-pushed user.

Specifically, the server inputs the target code into a content prediction network in the pre-trained content recommendation model, and performs a series of processing on the target code through the content prediction network to obtain the recommendation probability of the to-be-pushed content. The content prediction network in the pre-trained content recommendation model is a neural network model that may determine the recommendation probability of the to-be-pushed content based on the input target code.

S310: Determine push content corresponding to the to-be-pushed user from the to-be-pushed content based on the recommendation probability.

Specifically, the server uses the to-be-pushed content with the recommendation probability that meets a preset condition, such as the to-be-pushed content with the highest recommendation probability or the to-be-pushed content with the recommendation probability greater than a specific probability as the push content corresponding to the to-be-pushed user. This helps to improve the accuracy of the determined push content, and makes the content subsequently pushed to the to-be-pushed user more accurate, improving the accuracy of content pushing.

In an embodiment, after the push content corresponding to the to-be-pushed user is determined from the to-be-pushed content based on the recommendation probability, the server may further push the push content corresponding to the to-be-pushed user to the to-be-pushed user.

In an embodiment, the server may push the push content corresponding to the to-be-pushed user to the to-be-pushed user according to a preset push frequency, and display the push content with a higher recommendation probability through a user terminal interface of the to-be-pushed user to meet the interest requirements of the to-be-pushed user, implementing an accurate push of the push content. The preset push frequency refers to a push frequency of the to-be-pushed content, such as pushing 10 pieces of push content per minute.

In an embodiment, the server may further transform the push content corresponding to the to-be-pushed user into push content corresponding to a preset push mode, and push the push content to the to-be-pushed user. The preset push mode refers to a content layout mode of the push content, such as a graphic view mode, a text view mode, or a video view mode.

In an embodiment, the server may further receive a content push request of a user terminal. The content push request carries a user identifier of the to-be-pushed user. The push content of the to-be-pushed user corresponding to the user identifier is pushed to the user terminal from the to-be-pushed content.

In some embodiments, the user behavior code of the to-be-pushed user in the behavior evaluation dimensions is determined according to the data of the to-be-pushed user in the behavior evaluation dimensions, and the target code is obtained by combining the user portrait code corresponding to the user portrait information and the to-be-pushed content code corresponding to the to-be-pushed content; the recommendation probability of the to-be-pushed content is further determined according to the target code; and the push content corresponding to the to-be-pushed user is finally determined from the to-be-pushed content based on the recommendation probability. The data of the to-be-pushed user in the behavior evaluation dimensions, the user portrait information, and the to-be-pushed content are comprehensively considered, which helps to comprehensively and accurately describe the relationship between the to-be-pushed user and the content, so that the push content is determined more accurately, and the accuracy of the determination of the push content is further improved. In addition, accurate content recommendation is implemented based on the determined accurate push content, thereby improving the accuracy of content recommendation.

Figure 4:
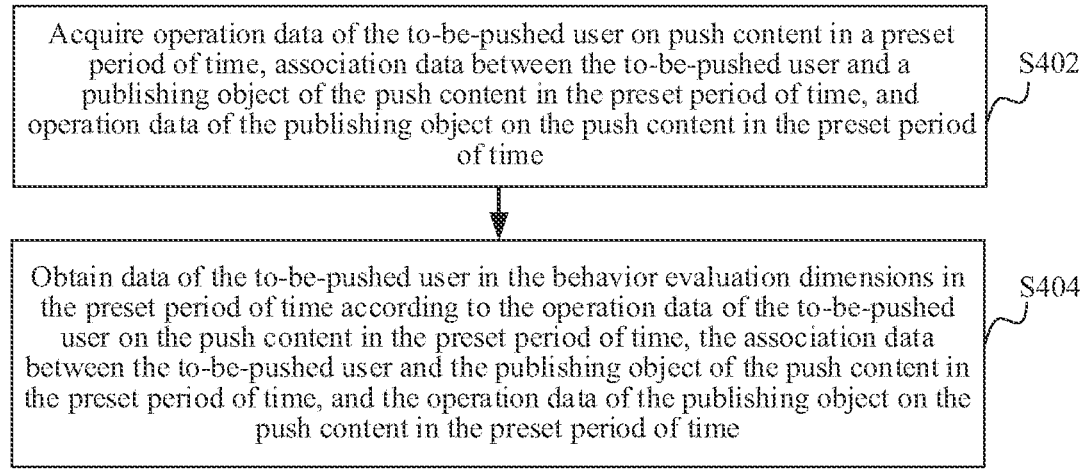
FIG. 4 is a schematic flowchart for obtaining data of a to-be-pushed user in behavior evaluation dimensions according to an example embodiment.

As shown in FIG. 4, in an embodiment, the obtaining data of a to-be-pushed user in a behavior evaluation dimensions in operation S302 specifically includes the following operations:

S402: Acquire operation data of the to-be-pushed user on push content in a preset period of time, association data between the to-be-pushed user and a publishing object of the push content in the preset period of time, and operation data of the publishing object on the push content in the preset period of time.

The operation data of the to-be-pushed user on the push content may refer to behavior data of the to-be-pushed user on the push content, such as likes, clicks, and forwards. The association data between the to-be-pushed user and the publishing object of the push content may refer to the following behavior data of the to-be-pushed user on the publishing object of the push content. The operation data of the publishing object on the push content may refer to the publishing behavior data of the publishing object on the push content.

Specifically, the server acquires behavior data related to the to-be-pushed user in the preset period of time based on the big data technology, and classifies the behavior data related to the to-be-pushed user in the preset period of time to obtain the operation data of the to-be-pushed user on the push content in the preset period of time, the association data between the to-be-pushed user and the publishing object of the push content in the preset period of time, and the operation data of the publishing object on the push content in the preset period of time.

S404: Obtain data of the to-be-pushed user in the behavior evaluation dimensions in the preset period of time based on the operation data of the to-be-pushed user on the push content in the preset period of time, the association data between the to-be-pushed user and the publishing object of the push content in the preset period of time, and the operation data of the publishing object on the push content in the preset period of time.

Specifically, the server classifies the operation data of the to-be-pushed user on the push content in the preset period of time, the association data between the to-be-pushed user and the publishing object of the push content in the preset period of time, and the operation data of the publishing object on the push content in the preset period of time into corresponding behavior evaluation dimensions based on correspondences between the data and the behavior evaluation dimensions, to obtain data of the to-be-pushed user in the behavior evaluation dimensions in the preset period of time.

In this embodiment, the data of the to-be-pushed user in the behavior evaluation dimensions in the preset period of time is obtained by performing statistical analysis on the operation data of the to-be-pushed user on the push content in the preset period of time, the association data between the to-be-pushed user and the publishing object of the push content in the preset period of time, and the operation data of the publishing object on the push content in the preset period of time, thereby obtaining the data of the to-be-pushed user in the behavior evaluation dimensions in the preset period of time, and helping to determine the user behavior code of the to-be-pushed user from a plurality of behavior evaluation dimensions, so that the determined user behavior code may reflect the user time-order feature and the user behavior feature of the to-be-pushed user, and the accuracy of the determined user behavior code is further improved.

Figure 5:
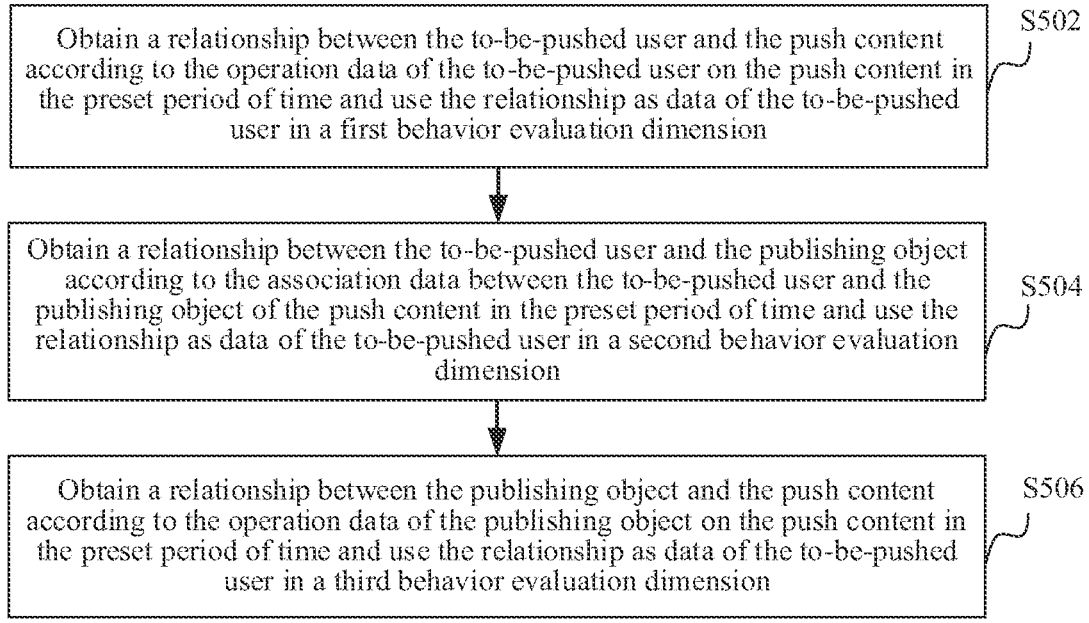
FIG. 5 is a schematic flowchart for obtaining data of a to-be-pushed user in behavior evaluation dimensions in a preset period of time according to an example embodiment.

As shown in FIG. 5, in an embodiment, when the behavior evaluation dimensions include a first behavior evaluation dimension, a second behavior evaluation dimension, and a third behavior evaluation dimension, the obtaining data of the to-be-pushed user in the behavior evaluation dimensions in the preset period of time based on the operation data of the to-be-pushed user on the push content in the preset period of time, the association data between the to-be-pushed user and the publishing object of the push content in the preset period of time, and the operation data of the publishing object on the push content in the preset period of time in operation S404 specifically includes:

S502: Obtain a relationship between the to-be-pushed user and the push content based on the operation data of the to-be-pushed user on the push content in the preset period of time and use the relationship as data of the to-be-pushed user in the first behavior evaluation dimension.

The first behavior evaluation dimension refers to a user-content operation perspective and is used for describing the relationship between the to-be-pushed user and the push content. The relationship between the to-be-pushed user and the push content may be a user-content click relationship, a user-content like relationship, a user-content comment relationship, or a user-content forwarding relationship.

For example, the server performs statistical analysis on the operation data of the to-be-pushed user on the push content in the preset period of time, to determine whether the to-be-pushed user clicks, likes, comments on, or forwards the push content, so as to obtain the relationship between the to-be-pushed user and the push content and use the relationship as data of the to-be-pushed user in the user-content operation perspective.

S504: Obtain a relationship between the to-be-pushed user and the publishing object based on the association data between the to-be-pushed user and the publishing object of the push content in the preset period of time and use the relationship as data of the to-be-pushed user in the second behavior evaluation dimension.

The second behavior evaluation dimension refers to a user-content publishing object association perspective and is used for describing the relationship between the to-be-pushed user and the content publishing object. The relationship between the to-be-pushed user and the publishing object may be a user-content publishing object following relationship, for example, the to-be-pushed user does not follow the content publishing object, or the to-be-pushed user follows the content publishing object.

For example, the server performs statistical analysis on the operation data of the to-be-pushed user on the push content in the preset period of time, to determine whether the to-be-pushed user has followed the content publishing object, so as to obtain the relationship between the to-be-pushed user and the content publishing object and use the relationship as data of the to-be-pushed user in the user-content publishing object perspective.

S506: Obtain a relationship between the publishing object and the push content based on the operation data of the publishing object on the push content in the preset period of time and use the relationship as data of the to-be-pushed user in the third behavior evaluation dimension.

The third behavior evaluation dimension refers to a content publishing object-content operation perspective and is used for describing the relationship between the content publishing object and the push content. The relationship between the content publishing object and the push content may be a content publishing object-content publishing relationship, for example, the publishing object has published the push content, or the publishing object does not publish the push content.

For example, the server performs statistical analysis on the operation data of the publishing object on the push content in the preset period of time, to determine whether the publishing object has published the push content, so as to obtain the relationship between the publishing object and the push content and use the relationship as data of the to-be-pushed user in the user-content publishing object perspective.

In the above-mentioned embodiment, statistical analysis is performed on the operation data of the to-be-pushed user on the push content in the preset period of time, the association data between the to-be-pushed user and the publishing object of the push content in the preset period of time, and the operation data of the publishing object on the push content in the preset period of time, which helps to obtain of the data of the to-be-pushed user in the behavior evaluation dimensions in the preset period of time, and determine the user behavior code of the to-be-pushed user from the plurality of behavior evaluation dimensions subsequently, essentially improving the accuracy of the determination of the user behavior code.

In an embodiment, if the data of the to-be-pushed user in the behavior evaluation dimensions includes data objects and data relationships between the data objects, the determining a user behavior code of the to-be-pushed user in the behavior evaluation dimensions based on the data of the to-be-pushed user in the behavior evaluation dimensions in operation S304 specifically includes: constructing a behavior graph network of the to-be-pushed user by using the data objects as nodes and the data relationships as edges of the nodes; and determining the user behavior code of the to-be-pushed user in the behavior evaluation dimensions based on the behavior graph network of the to-be-pushed user.

If the behavior evaluation dimension is the user-content operation perspective, the data objects of the to-be-pushed user in the user-content operation perspective are the to-be-pushed user and the push content, and the data relationship is the relationship between the to-be-pushed user and the push content, such as a click relationship, a like relationship, or a forwarding relationship. If the behavior evaluation dimension is the user-content publishing object association perspective, the data objects of the to-be-pushed user in the user-content publishing object association perspective are the to-be-pushed user and the publishing object, and the data relationship is the relationship between the to-be-pushed user and the publishing object, such as a following relationship. If the behavior evaluation dimension is the content publishing object-content operation perspective, the data objects of the to-be-pushed user in the content publishing object-content operation perspective are the content publishing object and the push content, and the data relationship is the relationship between the content publishing object and the push content, such as a publishing relationship.

The behavior graph network is a graph neural network including a series of objects and data relationships between the objects. The objects are the nodes of the behavior graph network, and the data relationships between objects are the edges of the behavior graph network. For example, if a user A clicks on content a, the user A and the content a are objects and are used as nodes in the behavior graph network. A click relationship between the user A and the content a refers to the data relationship between the objects, which is used as the edge of the behavior graph network. The behavior graph network of the to-be-pushed user is centered on the node corresponding to the to-be-pushed user.

Specifically, the server extracts the data objects and the data relationships between the data objects from the data of the to-be-pushed user in the behavior evaluation dimensions, converts the data objects into the nodes in the behavior graph network, and converts the data relationships into the edges between the nodes in the behavior graph network to construct the behavior graph network of the to-be-pushed user; and aggregates information of the nodes in the behavior graph network of the to-be-pushed user layer by layer by using a K-order aggregation algorithm, to obtain the user behavior code of the to-be-pushed user in the behavior evaluation dimensions. In this way, it is conducive to representing all relationships between the user and the content through the behavior graph network, and obtaining more accurate user behavior code through the behavior graph network.

Figure 6:
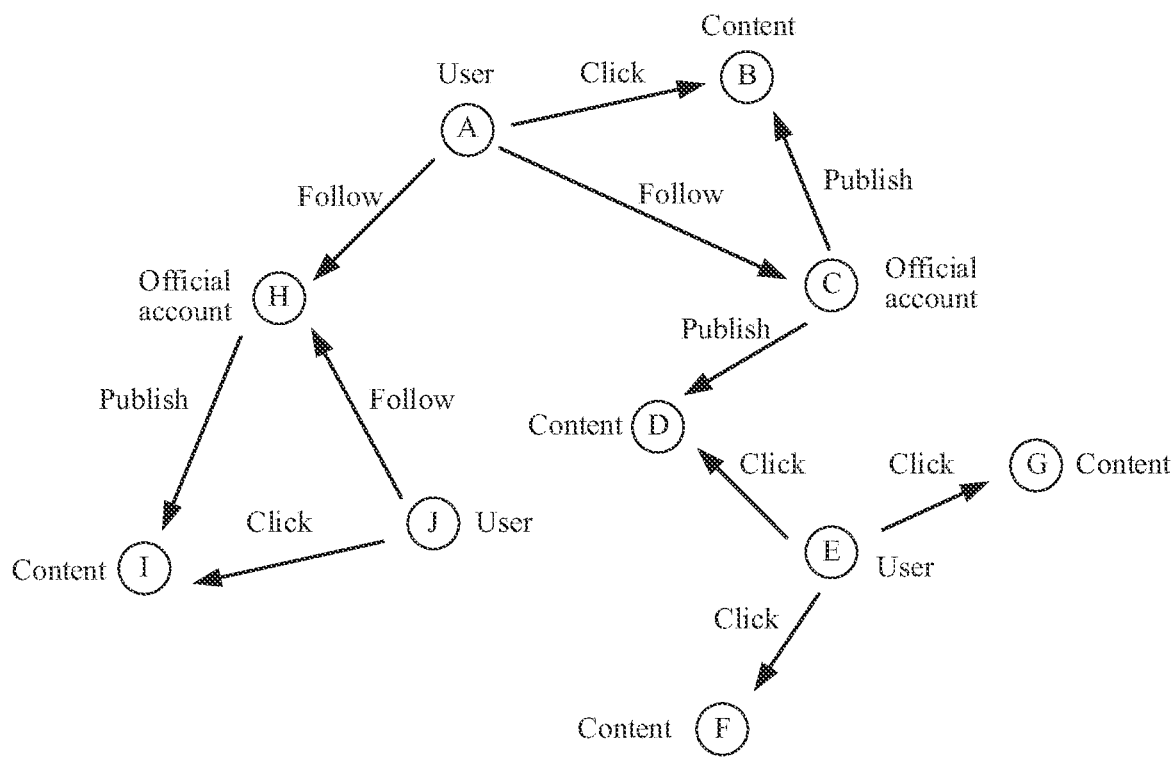
FIG. 6 is a schematic structural diagram of a behavior graph network of a to-be-pushed user according to an example embodiment.

For example, data of a to-be-pushed user A in the user-content operation perspective, the user-content publishing object association perspective, and the content publishing object-content operation perspective is as follows: the to-be-pushed user A has clicked on content B, the to-be-pushed user A has followed a publishing object C, and the publishing object C has published the content B. Then nodes in a behavior graph network are: an ID corresponding to the to-be-pushed user A, an ID corresponding to the content B, and an ID corresponding to the publishing object C. Edges in the behavior graph network are: a click relationship between the to-be-pushed user A and the content B, a following relationship between the to-be-pushed user A and the publishing object C, and a publishing relationship between the publishing object C and the content B. Referring to FIG. 6, the corresponding behavior graph network is constructed based on the above. The behavior graph network shown in FIG. 6 is only a part of the behavior graph network of the to-be-pushed user A, and is not a complete behavior graph network.

In the above-mentioned embodiment, the data of the to-be-pushed user in the behavior evaluation dimensions is converted into the corresponding behavior graph network, the graph network providing better description of the common relationship between the user and the content, so that the determined user behavior code is more accurate.

In an embodiment, the nodes in the behavior graph network match corresponding initial information codes, and the determining the user behavior code of the to-be-pushed user in the behavior evaluation dimensions based on the behavior graph network of the to-be-pushed user includes: inputting the initial information codes of the nodes in the behavior graph network of the to-be-pushed user into a pre-trained information embedding network model to obtain the user behavior code of the to-be-pushed user in the behavior evaluation dimensions, the pre-trained information embedding network model being configured to aggregate target information codes of neighbor nodes of the node in which the to-be-pushed user is located, and concatenate a target information code obtained after the aggregation and the initial information code of the node in which the to-be-pushed user is located, to obtain the user behavior code of the to-be-pushed user in the behavior evaluation dimensions, and the target information code of the neighbor node of the node in which the to-be-pushed user is located being obtained by aggregating target information codes of neighbor nodes of the neighbor node and concatenating a target information code obtained after the aggregation and the initial information code of the neighbor node of the node in which the to-be-pushed user is located.

The pre-trained information embedding network model is a feature embedding model that may obtain the user behavior code of the to-be-pushed user based on the information of the nodes in the behavior graph network of the to-be-pushed user, and is, for example, a DeepWalk network model, a GraphSAGE network model, or a PinSage network model.

The initial information codes matching the nodes in the behavior graph network are initialized feature vectors. The target information code of the neighbor node is a feature vector obtained after the aggregation. A target information code of each node in the behavior graph network is obtained by concatenating a target information code obtained after the aggregation of target information codes of neighbor nodes of the each node and the initial information code corresponding to the each node.

For example, referring to FIG. 6, the node in which the to-be-pushed user A is located is a central node, and the node in which the content B is located and the node in which the publishing object C is located are neighbor nodes of the node in which the to-be-pushed user A is located. Linear transformation, activation, and pooling are performed on a target information code B1 corresponding to the node in which the content B is located and a target information code C1 corresponding to the node in which the publishing object C is located, to obtain the processed target information code B1 and the processed target information code C1. The target information code B1 and the target information code C1 after linear transformation, activation, and pooling are concatenated together by column to obtain the target information code D1 after the aggregation. The target information code D1 obtained after the aggregation and an initial information code a1 of the node in which the to-be-pushed user A is located are concatenated by column to obtain a target information code A1 of the to-be-pushed user A as a user behavior code of the to-be-pushed user A in the behavior evaluation dimensions.

The target information code B1 corresponding to the node in which the content B is located is also obtained by performing linear transformation, activation, pooling, and concatenation on target information codes of neighbor nodes of the node, and concatenating a target information code obtained after the processing and an initial information code b1 corresponding to the node in which the content B is located by column. The target information code C1 corresponding to the node in which the publishing object C is located and a target information code corresponding to another node in the behavior graph network are also obtained by using the foregoing method.

In an embodiment, referring to FIG. 6, the edge between the node in which the to-be-pushed user A and the node in which the content B is located may be weighted to strengthen the importance of the edge. For example, the to-be-pushed user A clicks, likes, comments on, forwards, or performs another operation on the content B, it indicates that the edge is of relatively high importance, and also has a relatively high corresponding weight. Similarly, the edge between the node in which the to-be-pushed user A and the node in which the publishing object C is located may also be weighted to strengthen the importance of the edge. For example, the to-be-pushed user A often views content published by the publishing object C, it indicates that the edge is of relatively high importance, and also has a relatively high corresponding weight.

In an embodiment, the pre-trained information embedding network model is further configured to respectively weight the target information codes of the neighbor nodes of the node in which the to-be-pushed user is located based on weights between the node of the to-be-pushed user and the neighbor nodes, to obtain weighted target information codes of the neighbor nodes. The weighted target information codes of the neighbor nodes are aggregated, and the target information code obtained after the aggregation and the initial information code of the node in which the to-be-pushed user is located are concatenated to obtain the user behavior code of the to-be-pushed user in the behavior evaluation dimensions.

For example, referring to FIG. 6, supposing weights corresponding to the target information code B1 and the target information code C1 after linear transformation, activation, and pooling are respectively m and n, the target information code B1 and the target information code C1 are respectively weighted based on the weights m and n to obtain a weighted target information code mB1 and a weighted target information code nC1. The weighted target information code mB1 and the weighted target information code nC1 are concatenated together by column to obtain the target information code D1 after the aggregation. The target information code D1 obtained after the aggregation and the initial information code a1 of the node in which the to-be-pushed user A is located are concatenated by column to obtain the target information code A1 of the to-be-pushed user A as the user behavior code of the to-be-pushed user A in the behavior evaluation dimensions.

Figure 7:
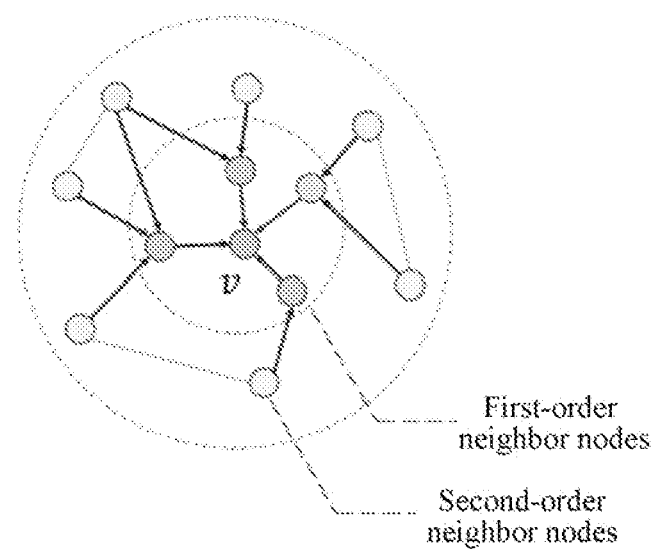
FIG. 7 is a schematic structural diagram of a behavior graph network of a to-be-pushed user according to an example embodiment.

In an actual scenario, referring to FIG. 7, the server uses the node in which the to-be-pushed user is located as a central node V, and uses nodes related to the node in which the to-be-pushed user A is located as first-order neighbor nodes, second-order neighbor nodes, and the like of the central node V. Target information codes of the second-order neighbor nodes of the first-order neighbor node are aggregated by using a K-order neighborhood aggregation algorithm, and a target information code obtained after the aggregation and an initial information code of the first-order neighbor node are concatenated to obtain a target information code of the first-order neighbor node. Similarly, target information codes of the first-order neighbor nodes may be obtained by using the same method. The target information codes of the first-order neighbor nodes are aggregated, and a target information code obtained after the aggregation and the initial information code of the node in which the to-be-pushed user is located (that is, the central node V) are concatenated to obtain the user behavior code of the to-be-pushed user in the behavior evaluation dimensions. A target information code of the second-order neighbor node is obtained by aggregating target information codes of neighbor nodes of the second-order neighbor node (that is, third-order neighbor nodes), and concatenating a target information code obtained after the aggregation and an initial information code of the second-order neighbor node.

In the above-mentioned embodiment, the user behavior code of the to-be-pushed user in the behavior evaluation dimensions is determined based on the information of the nodes in the behavior graph network of the to-be-pushed user, describing all common relationships between the user and the content better, so that the determined user behavior code is more accurate.

In an embodiment, the determining a recommendation probability of the to-be-pushed content based on the target code in operation S308 includes: inputting the target code into a pre-trained content recommendation model, and performing convolution pooling processing on the target code by using the pre-trained content recommendation model, to obtain the recommendation probability of the to-be-pushed content.

Specifically, the server inputs the target code into the pre-trained content recommendation model, and performs a series of neural network processing such as convolution pooling on the target code by using a content prediction network in the pre-trained content recommendation model, to obtain the recommendation probability of the to-be-pushed content. In this way, it is conducive to subsequently determining the push content corresponding to the to-be-pushed user from the to-be-pushed content based on the recommendation probability determined based on the user behavior code, the user portrait code, and a to-be-pushed information code, so that the subsequent content pushed to the to-be-pushed user is more accurate, thereby improving the accuracy of the determination of the push content.

Figure 8:
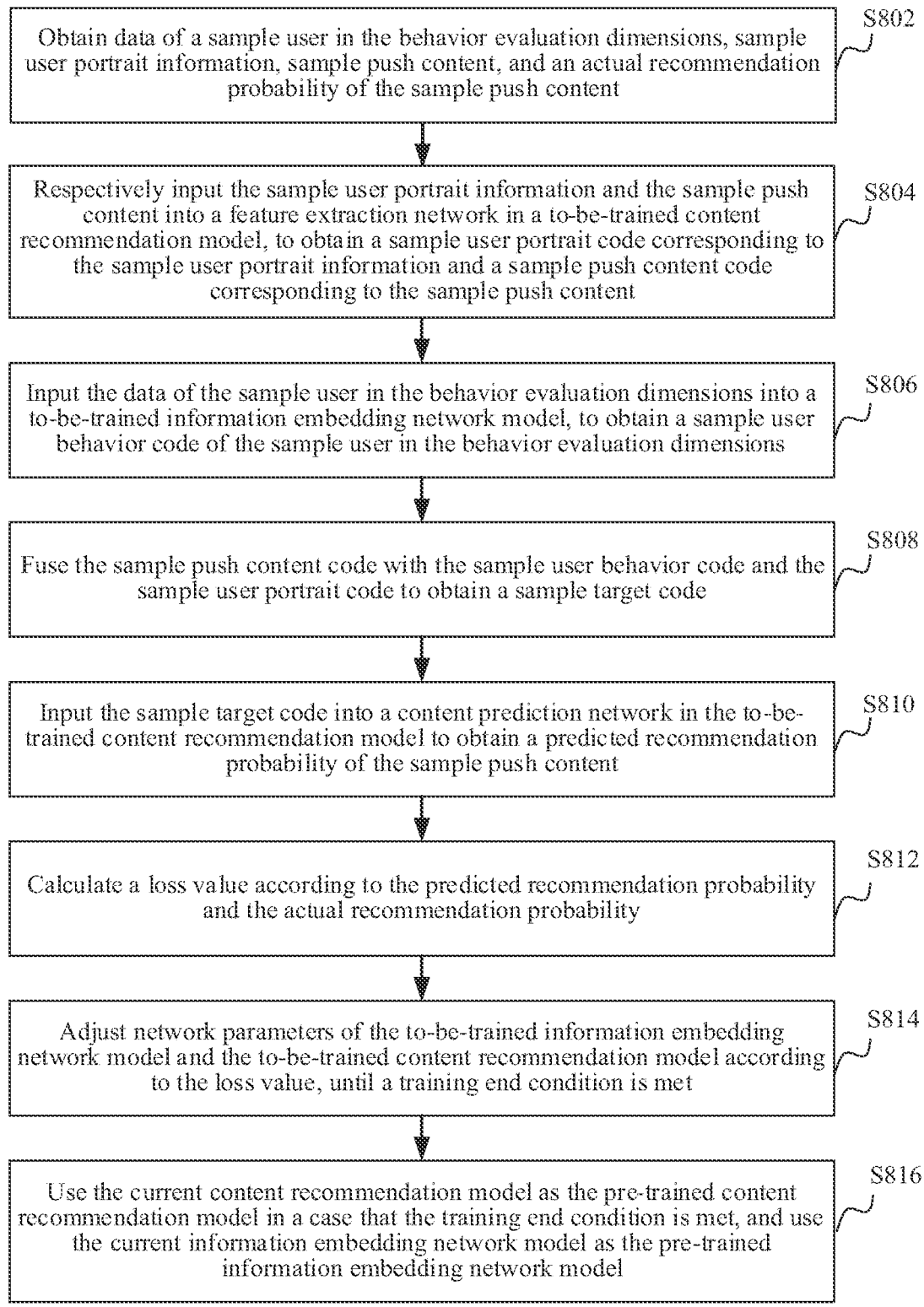
FIG. 8 is a schematic flowchart for training a pre-trained information embedding network model and a pre-trained content recommendation model according to an example embodiment.

As shown in FIG. 8, in an embodiment, the pre-trained information embedding network model and the pre-trained content recommendation model are trained through the following operations:

S802: Obtain data of a sample user in the behavior evaluation dimensions, sample user portrait information, sample push content, and an actual recommendation probability of the sample push content.

The actual recommendation probability of the sample push content is used for measuring whether the sample user has clicked the sample push content. If the sample user has clicked the sample push content, the actual recommendation probability is 1. In some embodiments, the actual recommendation probability of the sample push content may be alternatively a specific probability value obtained through actual analysis and statistics.

S804: Respectively input the sample user portrait information and the sample push content into a feature extraction network in a to-be-trained content recommendation model, to obtain a sample user portrait code corresponding to the sample user portrait information and a sample push content code corresponding to the sample push content.

S806: Input the data of the sample user in the behavior evaluation dimensions into a to-be-trained information embedding network model, to obtain a sample user behavior code of the sample user in the behavior evaluation dimensions.

Specifically, the server converts the data of the sample user in the behavior evaluation dimensions to obtain information of the sample user in a behavior graph network. The information of the sample user in the behavior graph network is inputted into the to-be-trained information embedding network model, and is then processed by using the to-be-trained information embedding network model, to obtain the sample user behavior code of the sample user in the behavior evaluation dimensions.

S808: Fuse the sample push content code with the sample user behavior code and the sample user portrait code to obtain a sample target code.

S810: Input the sample target code into a content prediction network in the to-be-trained content recommendation model to obtain a predicted recommendation probability of the sample push content.

S812: Calculate a loss value based on the predicted recommendation probability and the actual recommendation probability.

Specifically, the server obtains a preset loss value statistics file, and processes the predicted recommendation probability and the actual recommendation probability based on the preset loss value statistics file to obtain the loss value. The preset loss value statistics file is a logarithmic loss function that may count the loss value.

S814: Adjust network parameters of the to-be-trained information embedding network model and the to-be-trained content recommendation model based on the loss value, until a training end condition is met.

Specifically, if the obtained loss value does not meet the condition, network parameters of the to-be-trained information embedding network model and the to-be-trained content recommendation model are adjusted synchronously in the same backpropagation process, and operations S804 to S812 are repeated until the obtained loss value meets the condition, the training ends. In this way, it is conducive to synchronously updating the network parameters of the to-be-trained information embedding network model and the to-be-trained content recommendation model through parameter sharing by using a loss function, so that the user behavior code subsequently obtained by using the trained information embedding network model and the user portrait code and the to-be-pushed information code obtained by using the trained content recommendation model are in the same expression space.

S816: Use the current content recommendation model as the pre-trained content recommendation model when the training end condition is met, and use the current information embedding network model as the pre-trained information embedding network model.

In the above-mentioned embodiment, the information embedding network model and the content recommendation model are trained synchronously in the same backpropagation process, so that the user behavior code obtained by using the information embedding network model and the user portrait code and the to-be-pushed information code obtained by using the content recommendation model are in the same expression space, subsequently helping fuse the user behavior code, the user portrait code, and the to-be-pushed information code to obtain the target code, and obtain the recommendation probability of the to-be-pushed content based on the target code to determine more accurate push content, and further improving the accuracy of the determination of the push content. In addition, the information embedding network model and the content recommendation model are trained for a plurality of times, thereby helping improve the accuracy of the obtained user behavior code, user portrait code, and to-be-pushed information code.

In an embodiment, the determining push content corresponding to the to-be-pushed user from the to-be-pushed content based on the recommendation probability in operation S310 includes: determining the to-be-pushed content with the recommendation probability greater than a preset threshold as the push content corresponding to the to-be-pushed user.

For example, the server selects, from the to-be-pushed content, the to-be-pushed content with a recommendation probability greater than 0.6 as the push content corresponding to the to-be-pushed user. In this way, only the to-be-pushed content with a recommendation probability meeting the condition is determined as the push content corresponding to the to-be-pushed user, improving accuracy to determine the push content and further improving the accuracy of the determination of the push content.

Figure 9:
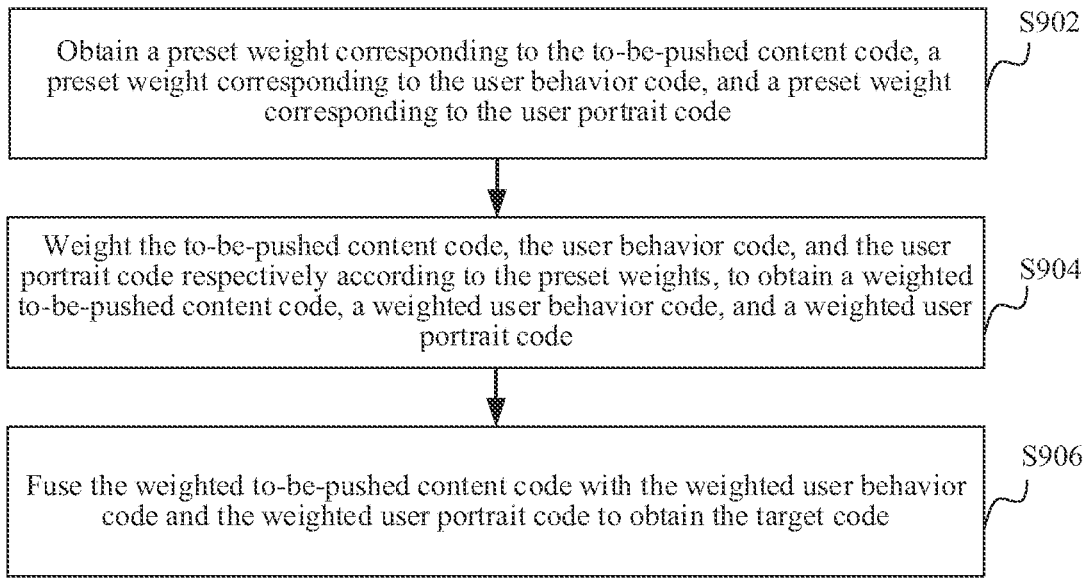
FIG. 9 is a schematic flowchart for determining a target code according to an example embodiment.

As shown in FIG. 9, in an embodiment, the fusing the to-be-pushed content code with the user behavior code and the user portrait code to obtain a target code in operation S306 specifically includes the following operations:

S902: Obtain a preset weight corresponding to the to-be-pushed content code, a preset weight corresponding to the user behavior code, and a preset weight corresponding to the user portrait code.

The preset weight corresponding to the to-be-pushed content code, the preset weight corresponding to the user behavior code, and the preset weight corresponding to the user portrait code are obtained by training based on historical data, and are respectively used for representing the importance respectively corresponding to the to-be-pushed content code, the user behavior code, and the user portrait code.

S904: Weight the to-be-pushed content code, the user behavior code, and the user portrait code respectively based on the preset weights, to obtain a weighted to-be-pushed content code, a weighted user behavior code, and a weighted user portrait code.

S906: Fuse the weighted to-be-pushed content code with the weighted user behavior code and the weighted user portrait code to obtain the target code.

Specifically, the server weights the to-be-pushed content code based on the preset weight corresponding to the to-be-pushed content code, to obtain the weighted to-be-pushed content code; weights the user behavior code based on the preset weight corresponding to the user behavior code, to obtain the weighted user behavior code; weights the user portrait code based on the preset weight corresponding to the user portrait code, to obtain the weighted user portrait code; and concatenates the weighted to-be-pushed content code with the weighted user behavior code and the weighted user portrait code to obtain a concatenated code as the target code.

For example, supposing the to-be-pushed content code, the user behavior code, and the user portrait code are X, Y, and Z, and the corresponding preset weights are a, b, and c respectively, the weighted to-be-pushed content code, the weighted user behavior code, and the weighted user portrait code are aX, bY and cZ respectively. The weighted to-be-pushed content code aX is concatenated with the weighted user behavior code bY and the weighted user portrait code cZ to obtain the target code.

In the above-mentioned embodiment, the to-be-pushed content code, the user behavior code, and the user portrait code are fused to obtain the target code, helping determining the recommendation probability of the to-be-pushed content based on the target code, further determining the push content corresponding to the to-be-pushed user from the to-be-pushed content based on the recommendation probability, and improving the accuracy of the determination of the push content.

In an embodiment, if the data of the to-be-pushed user in the behavior evaluation dimensions is the data of the to-be-pushed user in the behavior evaluation dimensions in the current period of time, embodiments of the present disclosure further include: obtaining data of the to-be-pushed user in the behavior evaluation dimensions in a next period of time.

Specifically, the server obtains data of the to-be-pushed user in the behavior evaluation dimensions in each period of time based on a preset frequency, for example, the data of the to-be-pushed user in the behavior evaluation dimensions in the next period of time of the current period of time. In this way, it is conducive to subsequently updating the data of the to-be-pushed user in the behavior evaluation dimensions in the current period of time based on the data of the to-be-pushed user in the behavior evaluation dimensions in the next period of time, ensuring the timeliness and accuracy of the data of the to-be-pushed user in the behavior evaluation dimensions.

Figure 10:
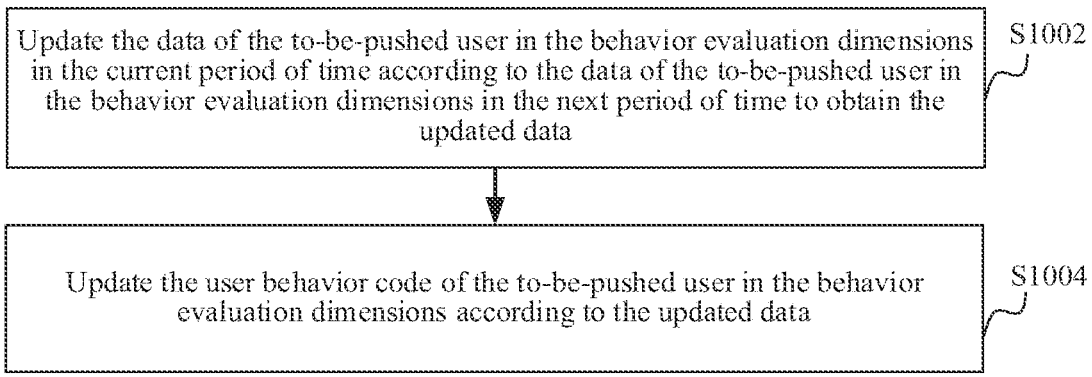
FIG. 10 is a schematic flowchart for determining a user behavior code of a to-be-pushed user in behavior evaluation dimensions according to an example embodiment.

As shown in FIG. 10, in an embodiment, the determining a user behavior code of the to-be-pushed user in the behavior evaluation dimensions based on the data of the to-be-pushed user in the behavior evaluation dimensions in operation S304 specifically includes the following operations:

S1002: Update the data of the to-be-pushed user in the behavior evaluation dimensions in the current period of time based on the data of the to-be-pushed user in the behavior evaluation dimensions in the next period of time to obtain the updated data.

Specifically, the server updates the data of the to-be-pushed user in the current period of time in the user-content operation perspective, the user-content publishing object association perspective, and the content publishing object-content operation perspective based on the data of the to-be-pushed user in the next period of time in the user-content operation perspective, the user-content publishing object association perspective, and the content publishing object-content operation perspective.

For example, if the to-be-pushed user clicks on a specific article, likes a specific article, or follows a specific WeChat official account in the next period of time (for example, T+1, T being a cycle), such behavior data is added in real-time to the data of the to-be-pushed user in the behavior evaluation dimension in the current period of time (such as T).

S1004: Update the user behavior code of the to-be-pushed user in the behavior evaluation dimensions based on the updated data.

Specifically, the server updates the behavior graph network of the to-be-pushed user based on the updated data with reference to the foregoing method for constructing the behavior graph network of the to-be-pushed user, to obtain the updated behavior graph network; inputs information in the updated behavior graph network into the pre-trained information embedding network model to obtain a user behavior code of the to-be-pushed user in the behavior evaluation dimensions. In this way, the user behavior code of the to-be-pushed user in the behavior evaluation dimensions is updated, ensuring the timeliness and accuracy of the obtained user behavior code.

Figure 11:
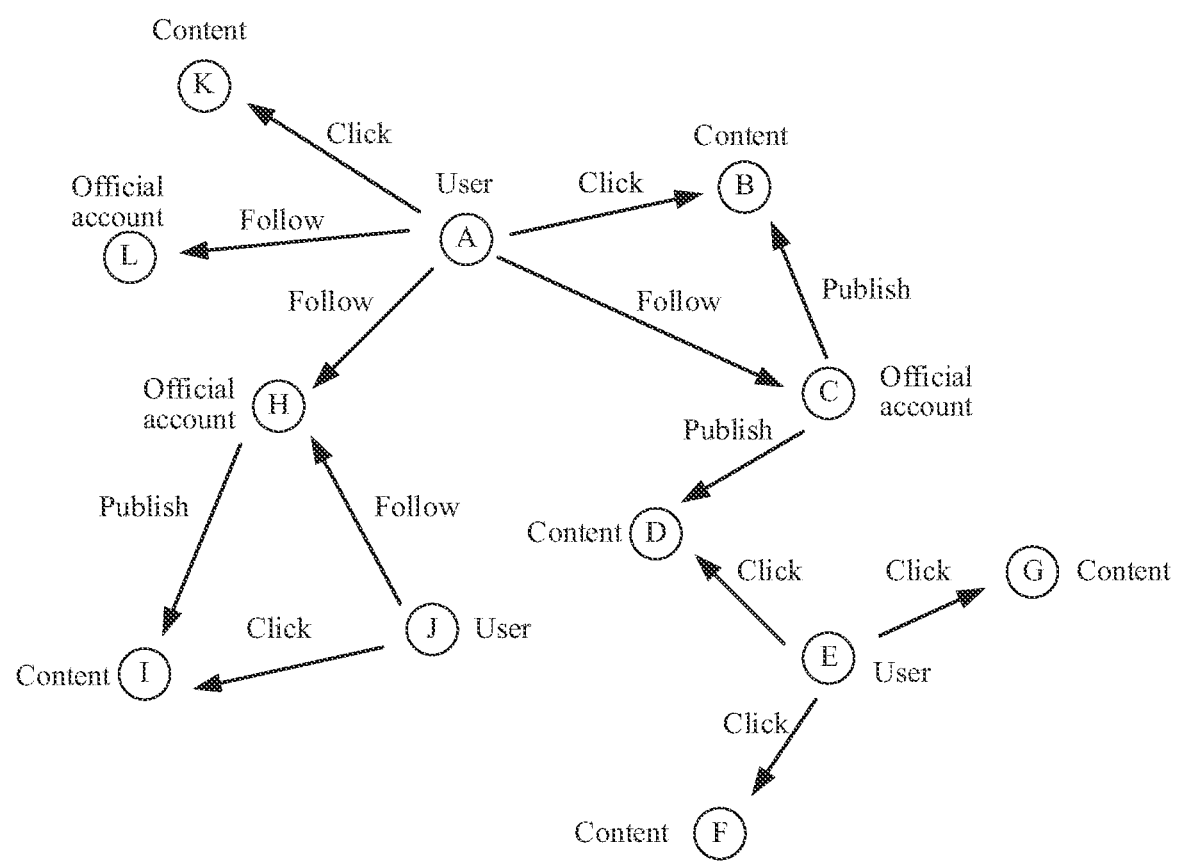
FIG. 11 is a schematic structural diagram of a behavior graph network of a to-be-pushed user according to an example embodiment.

For example, supposing FIG. 6 is the behavior graph network of the to-be-pushed user A in the current period of time T, and the to-be-pushed user A clicks on content K, follows an official account L in the next period of time (T+1), and so on, the behavior graph network shown in FIG. 6 is updated based on such information to obtain the updated behavior graph network shown in FIG. 11, and the user behavior code of the to-be-pushed user in the behavior evaluation dimensions is updated based on the updated behavior graph network, ensuring improved accuracy of the obtained user behavior code.

In the above-mentioned embodiment, the data of the to-be-pushed user in the behavior evaluation dimensions in the current period of time is updated, which helps improve the timeliness and accuracy of the obtained behavior graph network of the to-be-pushed user, further improves the timeliness and accuracy of the user behavior code of the to-be-pushed user in the behavior evaluation dimensions, and helps determine more accurate push content based on the updated user behavior code subsequently, thereby improving the accuracy of the determination of the push content.

Figure 12:
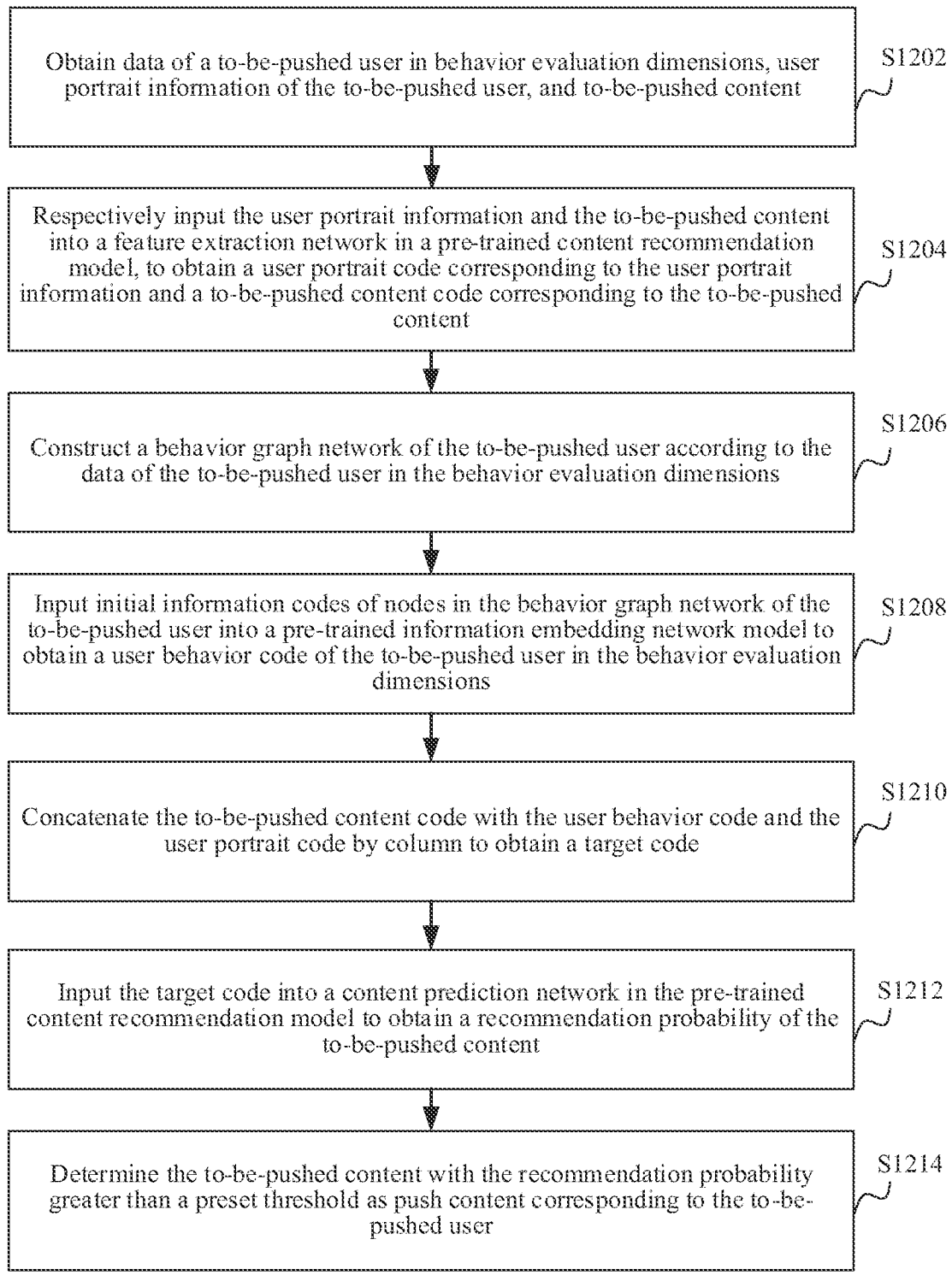
FIG. 12 is a schematic flowchart of a content processing method according to an example embodiment.

As shown in FIG. 12, in an embodiment, another content processing method is provided. This embodiment is described by using an example in which the method is applied to the server 110 in FIG. 1. Referring to FIG. 12, the content processing method specifically includes the following operations:

S1202: Obtain data of a to-be-pushed user in behavior evaluation dimensions, user portrait information of the to-be-pushed user, and to-be-pushed content.

S1204: Respectively input the user portrait information and the to-be-pushed content into a feature extraction network in a pre-trained content recommendation model, to obtain a user portrait code corresponding to the user portrait information and a to-be-pushed content code corresponding to the to-be-pushed content.

S1206: Construct a behavior graph network of the to-be-pushed user based on the data of the to-be-pushed user in the behavior evaluation dimensions.

S1208: Input initial information codes of nodes in the behavior graph network of the to-be-pushed user into a pre-trained information embedding network model to obtain a user behavior code of the to-be-pushed user in the behavior evaluation dimensions.

S1210: Concatenate the to-be-pushed content code with the user behavior code and the user portrait code by column to obtain a target code.

S1212: Input the target code into a content prediction network in the pre-trained content recommendation model to obtain a recommendation probability of the to-be-pushed content.

S1214: Determine the to-be-pushed content with the recommendation probability greater than a preset threshold as push content corresponding to the to-be-pushed user.

In the embodiment described above, the data of the to-be-pushed user in the behavior evaluation dimensions, the user portrait information, and the to-be-pushed content are comprehensively considered, which helps to comprehensively and accurately describe the relationship between the to-be-pushed user and the content, so that the determined push content is more accurate, and the accuracy of the determination of the push content is further improved. In addition, accurate content recommendation is implemented based on the determined accurate push content, thereby improving the accuracy of content recommendation.

Figure 13:
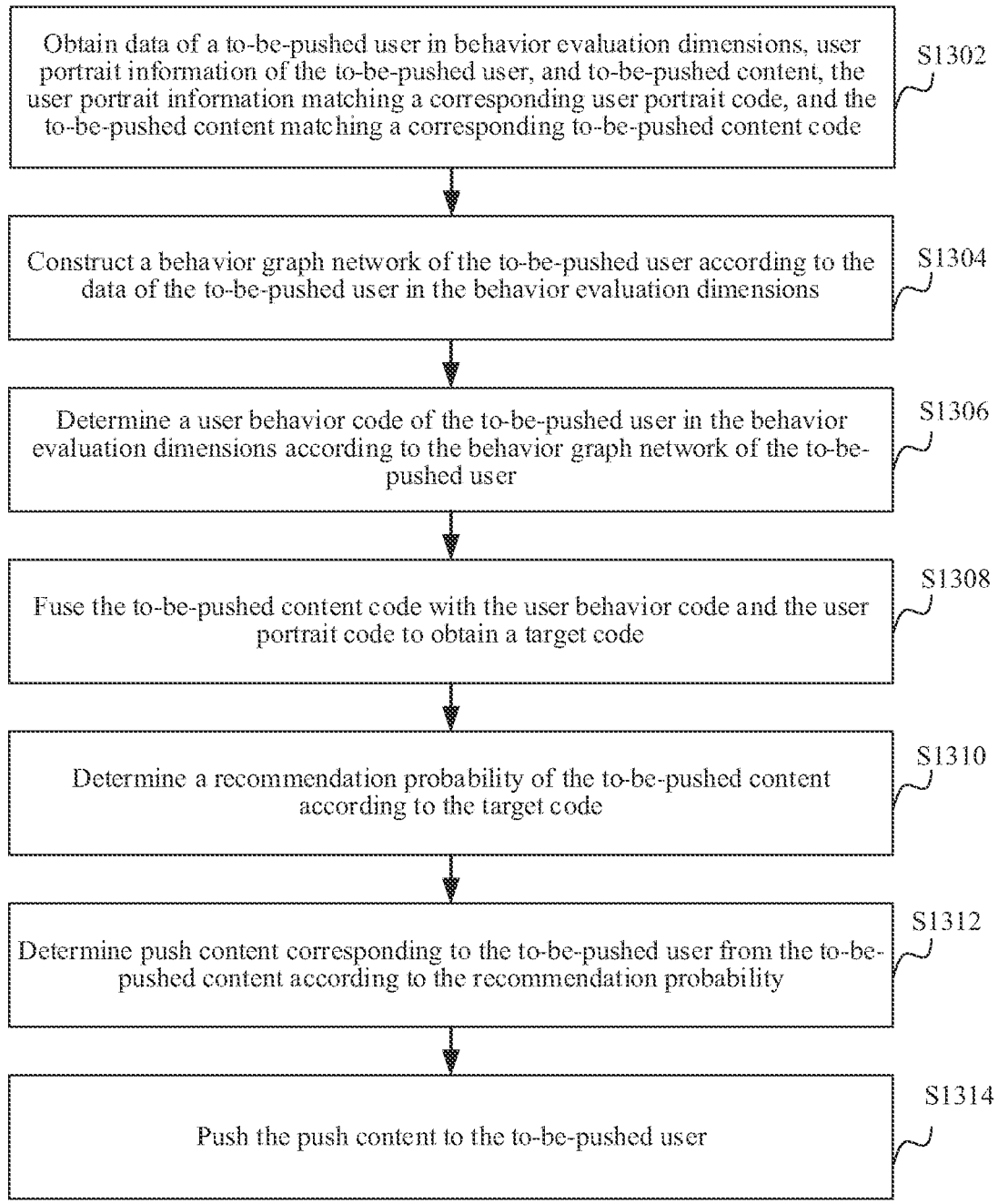
FIG. 13 is a schematic flowchart of a content push method according to an example embodiment.

As shown in FIG. 13, in an embodiment, a content push method is provided. This embodiment is described by using an example in which the method is applied to the server 110 in FIG. 1. Referring to FIG. 13, the content push method specifically includes the following operations:

S1302: Obtain data of a to-be-pushed user in behavior evaluation dimensions, user portrait information of the to-be-pushed user, and to-be-pushed content, the user portrait information matching a corresponding user portrait code, and the to-be-pushed content matching a corresponding to-be-pushed content code.

S1304: Construct a behavior graph network of the to-be-pushed user based on the data of the to-be-pushed user in the behavior evaluation dimensions.

S1306: Determine a user behavior code of the to-be-pushed user in the behavior evaluation dimensions based on the behavior graph network of the to-be-pushed user.

S1308: Fuse the to-be-pushed content code with the user behavior code and the user portrait code to obtain a target code.

S1310: Determine a recommendation probability of the to-be-pushed content based on the target code.

S1312: Determine push content corresponding to the to-be-pushed user from the to-be-pushed content based on the recommendation probability.

S1314: Push the push content to the to-be-pushed user.

Specifically, the server pushes the push content corresponding to the to-be-pushed user to a user terminal corresponding to the to-be-pushed user. The push content corresponding to the to-be-pushed user is displayed in an interface on the user terminal.

In an embodiment, the server may further receive a push request of the user terminal. The push request carries a user identifier of the to-be-pushed user; parse the push content to obtain the user identifier of the to-be-pushed user; and search the determined push content to obtain push content corresponding to the user identifier as the push content corresponding to the to-be-pushed user, and push the push content to the to-be-pushed user.

The determined push content includes push content corresponding to a plurality of user identifiers.

In the foregoing content push method, the push content corresponding to the to-be-pushed user is pushed to the to-be-pushed user from the determined content, which facilitates accurate push of the push content, improving the pushing accuracy of the push content, and improving the click-through rate (CTR) of the push content.

Figure 14:
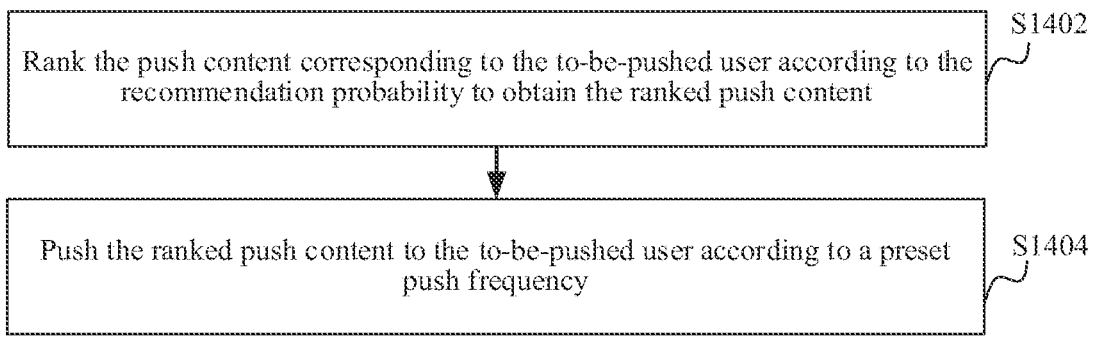
FIG. 14 is a schematic flowchart for pushing push content to a to-be-pushed user according to an example embodiment.

As shown in FIG. 14, in an embodiment, the pushing the push content to the to-be-pushed user in operation S1314 specifically includes the following operations:

S1402: Rank the push content corresponding to the to-be-pushed user based on the recommendation probability to obtain the ranked push content.

Each piece of the push content matches a corresponding recommendation probability.

Specifically, the server ranks the push content corresponding to the to-be-pushed user in descending order by the recommendation probabilities to obtain the ranked push content. In some embodiments, the push content corresponding to the to-be-pushed user may be comprehensively ranked with reference to other online rules.

S1404: Push the ranked push content to the to-be-pushed user based on a preset push frequency.

For example, the server selects push content with a top-ranked recommendation probability from the ranked push content based on the preset push frequency and pushes the selected push content to the to-be-pushed user. For example, the server selects 10 pieces of push content with top-ranked recommendation probabilities from the ranked push content based on a preset push frequency at which 10 pieces of push content are pushed per minute and pushes the 10 pieces of push content to the to-be-pushed user.

In the above-mentioned embodiment, the push content corresponding to the to-be-pushed user is ranked and then pushed to the to-be-pushed user based on the recommendation probability, which achieves the purpose of pushing the push content with the recommendation probability meeting the condition to the to-be-pushed user, and meets the interests and requirements of the to-be-pushed user, more accurately pushing the push content, and further improving the pushing accuracy of the push content.

Figure 15:
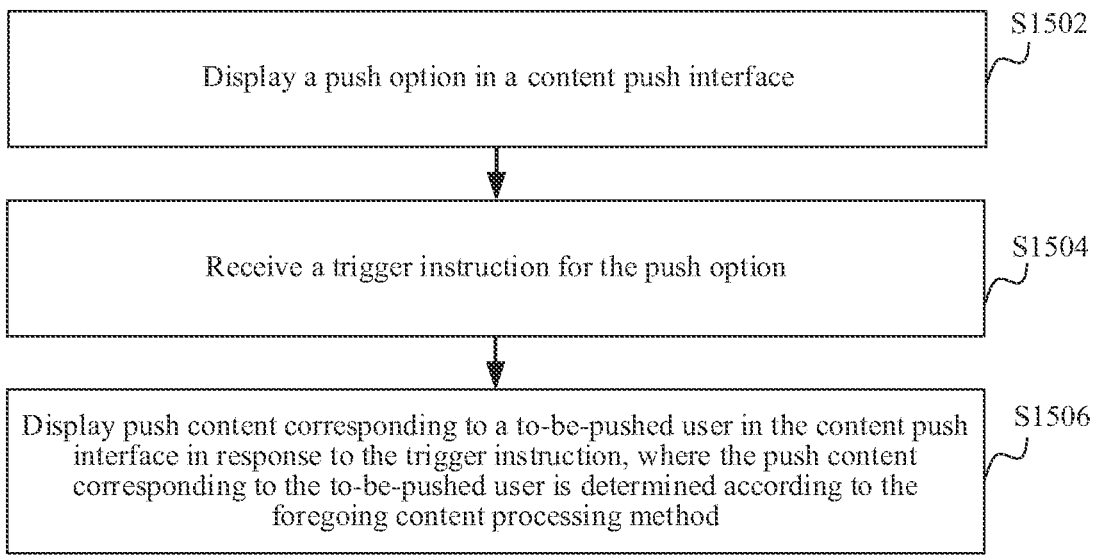
FIG. 15 is a schematic flowchart of a content display method according to an example embodiment.

As shown in FIG. 15, in an embodiment, a content display method is provided, specifically including the following operations:

S1502: Display a push option in a content push interface.

S1504: Receive a trigger instruction for the push option.

S1506: Display push content corresponding to a to-be-pushed user in the content push interface in response to the trigger instruction, where the push content corresponding to the to-be-pushed user is determined based on the above-mentioned content processing method.

Figure 16:
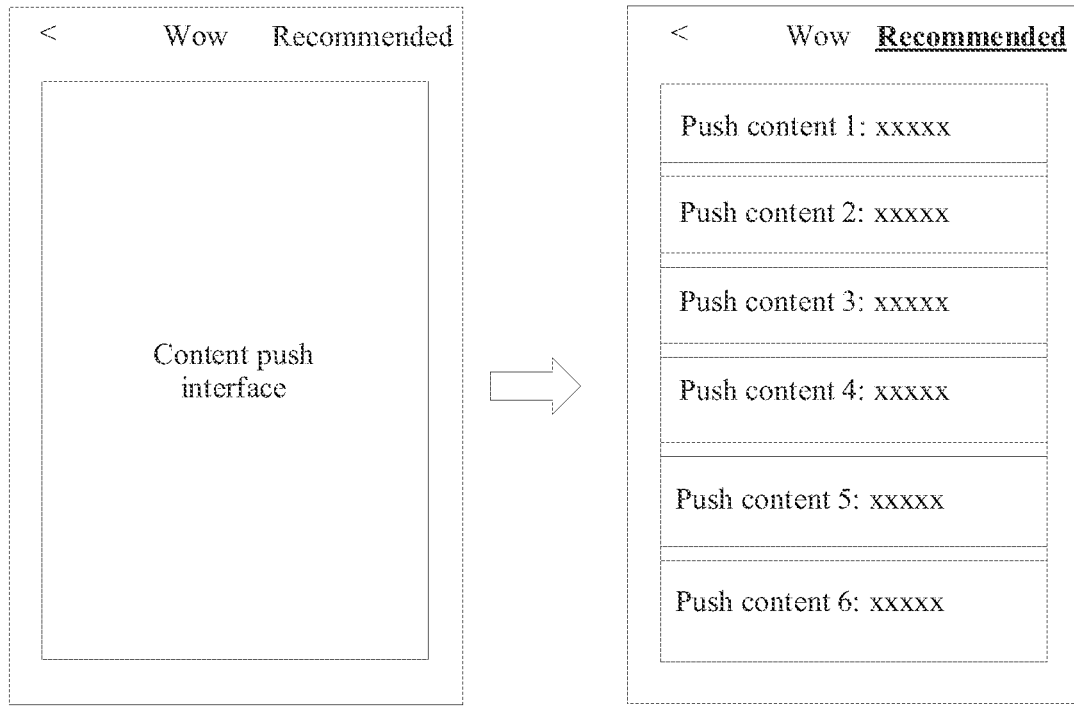
FIG. 16 is a schematic diagram of a content push interface according to an example embodiment.

Referring to FIG. 16, descriptions are made by using an exemplary application. As an example, an application may be "WeChat Top Stories." The application is installed on a user terminal, and a user starts the application and enters a corresponding content push interface of the application. The user clicks a push option, such as a "recommended" option, to trigger to generate a trigger instruction. The user terminal generates a push request in response to the trigger instruction, and transmits the push request to a corresponding server. The server pushes push content corresponding to the user to the application based on the push request, to display the push content corresponding to the user such as push content 1, push content 2, push content 3, push content 4, push content 5, and push content 6 by using the content push interface of the application.

The content push method in the present disclosure may be further applied to other content push scenarios in addition to the content push scenario of the "WeChat Top Stories". Through the foregoing content display method, the push content corresponding to the to-be-pushed user is displayed in the content push interface, and in addition, the accurate push of the push content is implemented, improving the pushing accuracy of the push content.

Figure 17:
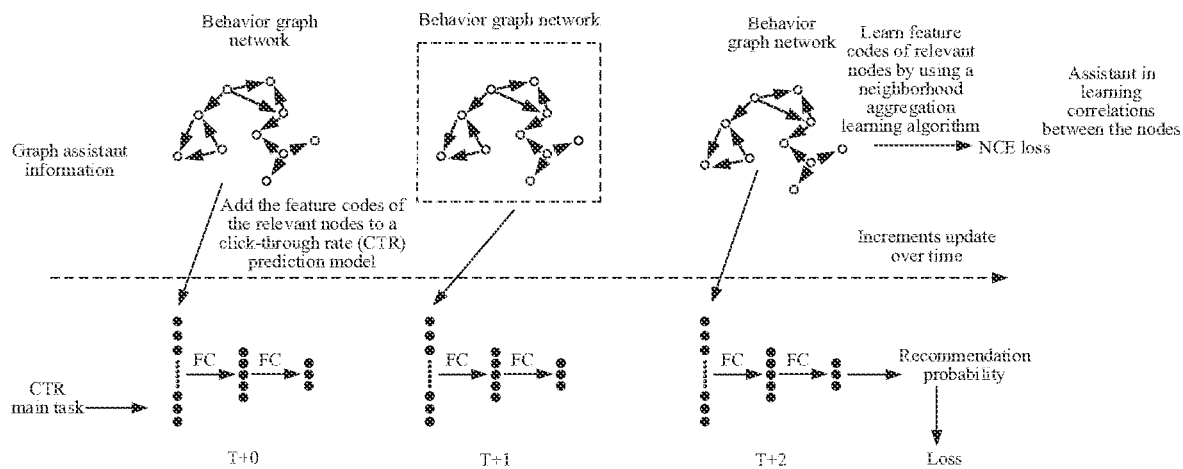
FIG. 17 is a schematic flowchart of a content processing method according to another embodiment.

As shown in FIG. 17, in an embodiment, another content push method is provided. This embodiment is described by using an example in which the method is applied to the server 110 in FIG. 1. Referring to FIG. 17, the content push method specifically includes the following steps:

acquiring data of a to-be-pushed user in behavior evaluation dimensions first, and constructing a behavior graph network of the to-be-pushed user based on the data of the to-be-pushed user in the behavior evaluation dimensions; using a node in which the to-be-pushed user is located as a central node in the behavior graph network of the to-be-pushed user; and learning feature codes of nodes in the behavior graph network based on a neighborhood aggregation learning algorithm by using an information embedding network model, and learning correlations between the nodes in the behavior graph network with the assistance of an NCE loss function, to obtain the feature code of the node in which the to-be-pushed user is located as a user behavior code of the to-be-pushed user;

subsequently, acquiring user portrait information of the to-be-pushed user and to-be-pushed content, and respectively inputting the user portrait information and the to-be-pushed content into a feature extraction network in a pre-trained content recommendation model (e.g., a CTR prediction model), to obtain a user portrait code corresponding to the user portrait information and a to-be-pushed content code corresponding to the to-be-pushed content; adding the user behavior code of the to-be-pushed user learned by the information embedding network model to a content prediction network in the pre-trained content recommendation model, and concatenating the to-be-pushed content code, the user behavior code, and the user portrait code by column by using the content prediction network, to obtain a target code; performing fully-connected (FC) processing on the target code for a plurality of times to obtain a recommendation probability of the to-be-pushed content.

After the recommendation probability of the to-be-pushed content is obtained, the method may be divided into two steps: first, in a case of being in a model training process, calculating a loss value based on the recommendation probability of the to-be-pushed content and an actual recommendation probability by using a loss function after the recommendation probability of the to-be-pushed content is obtained, and synchronously adjusting network parameters of the information embedding network model and the pre-trained content recommendation model based on the loss value based on a backpropagation algorithm, until a training end condition is met; and in a case of being in a content pushing process, determining the to-be-pushed content with the recommendation probability greater than a preset threshold as push content corresponding to the to-be-pushed user, and pushing the push content to the to-be-pushed user.

In an embodiment, after the behavior graph network in a (T+0) period of time is obtained, if the to-be-pushed user clicks on a specific article, likes a specific article, or follows a specific account on an application (e.g., WeChat official account) within a (T+1) period of time, the behavior graph network of the to-be-pushed user in the (T+0) period of time is updated based on the above data, and the updated behavior graph network is obtained as the latest behavior graph network of the to-be-pushed user. The user behavior code of the to-be-pushed user in the behavior evaluation dimensions are updated based on the latest behavior graph network of the to-be-pushed user. The to-be-pushed content code is fused with the user behavior code and the user portrait code to obtain a target code. A recommendation probability of the to-be-pushed content is re-determined based on the target code. Push content corresponding to the to-be-pushed user is re-determined from the to-be-pushed content based on the recommendation probability, thereby ensuring the timeliness and accuracy of the determined push content.

In an embodiment, the above-mentioned disclosures provide a solution for determining the push content corresponding to the to-be-pushed user may be applied to a recommendation scenario on an application interface (e.g., list page of Top Stories on WeChat). As shown in FIG. 16, the push content corresponding to the to-be-pushed user such as news or videos is pushed to the to-be-pushed user.

The foregoing embodiments may have the following effects: In an offline stage, the area under the curve (AUC) increases by 0.52%, and online indicators are improved significantly after going online, which is mainly reflected in core indicators such as the overall exposure CTR that increases by 1.25%, the overall dwell time that increases by 0.67%, the image-text exposure CTR that increases by 2.00%, and the image-text reading time that increases by 2.40%.

Although the operations in the flowcharts of FIG. 3 to FIG. 5, FIG. 8 to FIG. 10, and FIG. 12 to FIG. 15 are sequentially displayed based on indication of arrows, the operations are not necessarily sequentially performed in the sequence indicated by the arrows. Unless explicitly specified in the present specification, execution of the operations is not strictly limited in the sequence, and the operations may be performed in other sequences. Moreover, at least some of the operations in FIG. 3 to FIG. 5, FIG. 8 to FIG. 10, and FIG. 12 to FIG. 15 may include a plurality of sub-operations or a plurality of stages. These sub-operations or stages are not necessarily performed at the same moment, but may be performed at different moments. These sub-operations or stages are not necessarily executed sequentially, but may be performed in turn or alternately with another operation or at least some of sub-operations or stages of the another operation.

Figure 18:
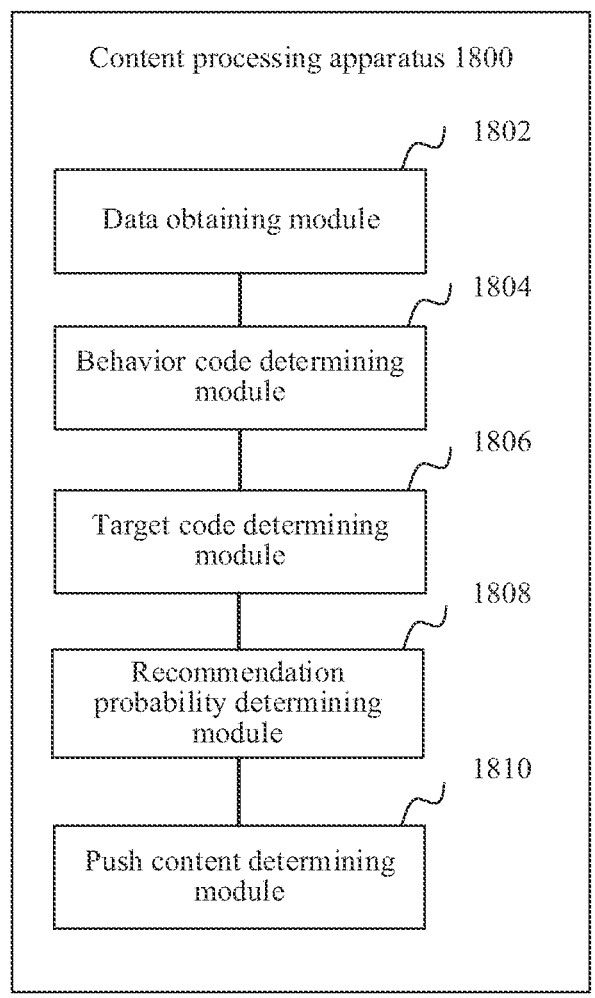
FIG. 18 is a structural block diagram of a content processing apparatus according to an example embodiment.

As shown in FIG. 18, in an embodiment, a content processing apparatus 1800 is provided. The apparatus 1800 includes a data obtaining module 1802, a behavior code determining module 1804, a target code determining module 1806, a recommendation probability determining module 1808, and a push content determining module 1810.

The data obtaining module 1802 is configured to obtain data of a to-be-pushed user in behavior evaluation dimensions, user portrait information of the to-be-pushed user, and to-be-pushed content, the user portrait information matching a corresponding user portrait code, and the to-be-pushed content matching a corresponding to-be-pushed content code.

The behavior code determining module 1804 is configured to determine a user behavior code of the to-be-pushed user in the behavior evaluation dimensions based on the data of the to-be-pushed user in the behavior evaluation dimensions.

The target code determining module 1806 is configured to fuse the to-be-pushed content code with the user behavior code and the user portrait code to obtain a target code.

The recommendation probability determining module 1808 is configured to determine a recommendation probability of the to-be-pushed content based on the target code.

The push content determining module 1810 is configured to determine push content corresponding to the to-be-pushed user from the to-be-pushed content based on the recommendation probability.

In the above-mentioned embodiment, the content processing apparatus determines the user behavior code of the to-be-pushed user in the behavior evaluation dimensions based on the data of the to-be-pushed user in the behavior evaluation dimensions, and obtains the target code by combining the user portrait code corresponding to the user portrait information and the to-be-pushed content code corresponding to the to-be-pushed content; further determines the recommendation probability of the to-be-pushed content based on the target code; and finally determines the push content corresponding to the to-be-pushed user from the to-be-pushed content based on the recommendation probability. The data of the to-be-pushed user in the behavior evaluation dimensions, the user portrait information, and the to-be-pushed content are comprehensively considered, which helps to comprehensively and accurately describe the relationship between the to-be-pushed user and the content, so that the determined push content is more accurate, and the accuracy of the determination of the push content is further improved. In addition, accurate content recommendation is implemented based on the determined accurate push content, improving the accuracy of content recommendation.

In an embodiment, the data obtaining module 1802 is further configured to acquire operation data of the to-be-pushed user on push content in a preset period of time, association data between the to-be-pushed user and a publishing object of the push content in the preset period of time, and operation data of the publishing object on the push content in the preset period of time; and obtain data of the to-be-pushed user in the behavior evaluation dimensions in the preset period of time based on the operation data of the to-be-pushed user on the push content in the preset period of time, the association data between the to-be-pushed user and the publishing object of the push content in the preset period of time, and the operation data of the publishing object on the push content in the preset period of time.

In an embodiment, the behavior evaluation dimensions include a first behavior evaluation dimension, a second behavior evaluation dimension, and a third behavior evaluation dimension, and the data obtaining module 1802 is further configured to obtain a relationship between the to-be-pushed user and the push content based on the operation data of the to-be-pushed user on the push content in the preset period of time and use the relationship as data of the to-be-pushed user in the first behavior evaluation dimension; obtain a relationship between the to-be-pushed user and the publishing object based on the association data between the to-be-pushed user and the publishing object of the push content in the preset period of time and use the relationship as data of the to-be-pushed user in the second behavior evaluation dimension; and obtain a relationship between the publishing object and the push content based on the operation data of the publishing object on the push content in the preset period of time and use the relationship as data of the to-be-pushed user in the third behavior evaluation dimension In an embodiment, the data of the to-be-pushed user in the behavior evaluation dimensions includes data objects and data relationships between the data objects; and the behavior code determining module 1804 is further configured to construct a behavior graph network of the to-be-pushed user by using the data objects as nodes and the data relationships as edges of the nodes; and determine the user behavior code of the to-be-pushed user in the behavior evaluation dimensions based on the behavior graph network of the to-be-pushed user.

In an embodiment, the nodes in the behavior graph network match corresponding initial information codes; and the behavior code determining module 1804 is further configured to input the initial information codes of the nodes in the behavior graph network of the to-be-pushed user into a pre-trained information embedding network model to obtain the user behavior code of the to-be-pushed user in the behavior evaluation dimensions, the pre-trained information embedding network model being configured to aggregate target information codes of neighbor nodes of the node in which the to-be-pushed user is located, and concatenate a target information code obtained after the aggregation and the initial information code of the node in which the to-be-pushed user is located, to obtain the user behavior code of the to-be-pushed user in the behavior evaluation dimensions, and the target information code of the neighbor node of the node in which the to-be-pushed user is located being obtained by aggregating target information codes of neighbor nodes of the neighbor node and concatenating a target information code obtained after the aggregation and the initial information code of the neighbor node of the node in which the to-be-pushed user is located.

In an embodiment, the recommendation probability determining module 1808 is further configured to input the target code into a pre-trained content recommendation model, and perform convolution pooling processing on the target code by using the pre-trained content recommendation model, to obtain the recommendation probability of the to-be-pushed content.

In an embodiment, the content processing apparatus 1800 may further specifically include a model training module.

The model training module is configured to obtain data of a sample user in the behavior evaluation dimensions, sample user portrait information, sample push content, and an actual recommendation probability of the sample push content; respectively input the sample user portrait information and the sample push content into a feature extraction network in a to-be-trained content recommendation model, to obtain a sample user portrait code corresponding to the sample user portrait information and a sample push content code corresponding to the sample push content; input the data of the sample user in the behavior evaluation dimensions into a to-be-trained information embedding network model, to obtain a sample user behavior code of the sample user in the behavior evaluation dimensions; fuse the sample push content code with the sample user behavior code and the sample user portrait code to obtain a sample target code; input the sample target code into a content prediction network in the to-be-trained content recommendation model to obtain a predicted recommendation probability of the sample push content; calculate a loss value based on the predicted recommendation probability and the actual recommendation probability; adjust network parameters of the to-be-trained information embedding network model and the to-be-trained content recommendation model based on the loss value, until a training end condition is met; and use the current content recommendation model as the pre-trained content recommendation model when the training end condition is met, and use the current information embedding network model as the pre-trained information embedding network model.

In an embodiment, the push content determining module 1810 is further configured to determine the to-be-pushed content with the recommendation probability greater than a preset threshold as the push content corresponding to the to-be-pushed user.

In an embodiment, the target code determining module 1806 is further configured to obtain a preset weight corresponding to the to-be-pushed content code, a preset weight corresponding to the user behavior code, and a preset weight corresponding to the user portrait code; weight the to-be-pushed content code, the user behavior code, and the user portrait code respectively based on the preset weights, to obtain a weighted to-be-pushed content code, a weighted user behavior code, and a weighted user portrait code; and fuse the weighted to-be-pushed content code with the weighted user behavior code and the weighted user portrait code to obtain the target code.

In an embodiment, the data of the to-be-pushed user in the behavior evaluation dimensions is the data of the to-be-pushed user in the behavior evaluation dimensions in the current period of time, the content processing apparatus 1800 may further specifically include a first data obtaining module.

The first data obtaining module is configured to obtain data of the to-be-pushed user in the behavior evaluation dimensions in a next period of time.

In an embodiment, the behavior code determining module 1804 is further configured to update the data of the to-be-pushed user in the behavior evaluation dimensions in the current period of time based on the data of the to-be-pushed user in the behavior evaluation dimensions in the next period of time to obtain the updated data; and update the user behavior code of the to-be-pushed user in the behavior evaluation dimensions based on the updated data.

In an embodiment, the content processing apparatus provided in the present disclosure may be implemented in the form of computer-readable instructions, and the computer-readable instructions may run on the computer device shown in FIG. 2. The memory of the computer device may store program modules forming the content processing apparatus, for example, the data obtaining module 1802, the behavior code determining module 1804, the target code determining module 1806, the recommendation probability determining module 1808, and the push content determining module 1810 shown in FIG. 18. A computer-readable instruction formed by the program modules causes the processor to perform the operations in the content processing method in the embodiments of the present disclosure described in the present specification.

For example, the computer device shown in FIG. 2 may obtain data of a to-be-pushed user in behavior evaluation dimensions, user portrait information of the to-be-pushed user, and to-be-pushed content by using the data obtaining module 1802 in the content processing apparatus shown in FIG. 18, the user portrait information matching a corresponding user portrait code, and the to-be-pushed content matching a corresponding to-be-pushed content code. The computer device may determine a user behavior code of the to-be-pushed user in the behavior evaluation dimensions based on the data of the to-be-pushed user in the behavior evaluation dimensions by using the behavior code determining module 1804. The computer device may fuse the to-be-pushed content code with the user behavior code and the user portrait code by using the target code determining module 1806, to obtain a target code. The computer device may determine a recommendation probability of the to-be-pushed content based on the target code by using the recommendation probability determining module 1808, and determine push content corresponding to the to-be-pushed user from the to-be-pushed content based on the recommendation probability by using the push content determining module 1810.

In an embodiment, a computer device is provided, including a memory and a processor. The memory stores computer-readable instructions, the computer-readable instructions, when executed by the processor, causing the processor to perform the operations in the foregoing content processing method. The operations in the content processing method may be operations in the content processing method in the foregoing embodiments.

In an embodiment, a computer-readable storage medium is provided, the computer-readable storage medium storing computer-readable instructions, the computer-readable instructions, when executed by a processor, causing the processor to perform the operations in the foregoing content processing method. The operations in the content processing method may be operations in the content processing method in the foregoing embodiments.

In an embodiment, a computer-readable instruction product or a computer-readable instruction is provided, the computer-readable instruction product or the computer-readable instruction includes computer instructions, and the computer instructions are stored in a computer-readable storage medium. The processor of the computer device reads the computer instructions from the computer-readable storage medium, and the processor executes the computer instructions, to cause the computer device to perform the operations in the method embodiments.

A person of ordinary skill in the art may understand that all or some of procedures of the method in the foregoing embodiments may be implemented by instructing relevant hardware by using computer-readable instructions. The computer-readable instructions may be stored in a non-volatile computer-readable storage medium. When the computer-readable instructions are executed, the procedures of the foregoing method embodiments may be implemented. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in the present specification.

The foregoing embodiments only show several implementations of the present disclosure, and descriptions thereof are in detail, but are not to be understood as a limitation to the patent scope of the present disclosure. A person of ordinary skill in the art may further make several variations and improvements without departing from the ideas of the present disclosure, and such variations and improvements all fall within the protection scope of the present disclosure. Therefore, the protection scope of the present disclosure is subject to the protection scope of the appended claims.

What is claimed is:

1. A content processing method, performed by at least one processor, the method comprising:
   obtaining data of a to-be-pushed user in behavior evaluation dimensions, user portrait information of the to-be-pushed user, and to-be-pushed content, wherein the user portrait information matches a corresponding user portrait code, and the to-be-pushed content matches a corresponding to-be-pushed content code;
   determining a user behavior code of the to-be-pushed user in the behavior evaluation dimensions based on the data of the to-be-pushed user in the behavior evaluation dimensions;
   obtaining a target code based on the to-be-pushed content code, the user behavior code, and the user portrait code;
   determining a recommendation probability of the to-be-pushed content based on the target code; and
   determining push content corresponding to the to-be-pushed user from the to-be-pushed content based on the recommendation probability,
   wherein the behavior evaluation dimensions comprise a first behavior evaluation dimension and a second behavior evaluation dimension,
   wherein the first behavior evaluation dimension uses a first relationship between the to-be-pushed user and the push content in a preset period of time, and
   wherein the second behavior evaluation dimension uses a second relationship between the to-be-pushed user and a publishing object of the push content in the preset period of time.

2. The method of claim 1, wherein the obtaining data of the to-be-pushed user in the behavior evaluation dimensions comprises:

acquiring operation data of the to-be-pushed user on the push content in the preset period of time, association data between the to-be-pushed user and the publishing object of the push content in the preset period of time, and operation data of the publishing object on the push content in the preset period of time; and obtaining data of the to-be-pushed user in the behavior evaluation dimensions in the preset period of time based on the operation data of the to-be-pushed user on the push content in the preset period of time, the association data between the to-be-pushed user and the publishing object of the push content in the preset period of time, and the operation data of the publishing object on the push content in the preset period of time.

3. The method of claim 2, wherein the behavior evaluation dimensions further comprises a third behavior evaluation dimension; and wherein the obtaining data of the to-be-pushed user in the behavior evaluation dimensions in the preset period of time comprises:

obtaining the first relationship between the to-be-pushed user and the push content based on the operation data of the to-be-pushed user on the push content in the preset period of time, and using the first relationship between the to-be-pushed user and the push content as data of the to-be-pushed user in the first behavior evaluation dimension;

obtaining the second relationship between the to-be-pushed user and the publishing object based on the association data between the to-be-pushed user and the publishing object of the push content in the preset period of time, and using the second relationship between the to-be-pushed user and the publishing object as data of the to-be-pushed user in the second behavior evaluation dimension; and obtaining a third relationship between the publishing object and the push content based on the operation data of the publishing object on the push content in the preset period of time, and using the third relationship between the publishing object and the push content as data of the to-be-pushed user in the third behavior evaluation dimension.

4. The method of claim 1, wherein the data of the to-be-pushed user in the behavior evaluation dimensions comprises data objects and data relationships between the data objects; and the determining the user behavior code of the to-be-pushed user in the behavior evaluation dimensions based on the data of the to-be-pushed user in the behavior evaluation dimensions comprises:

constructing a behavior graph network of the to-be-pushed user by using the data objects as nodes and the data relationships between the data objects as edges of the nodes; and determining the user behavior code of the to-be-pushed user in the behavior evaluation dimensions based on the behavior graph network of the to-be-pushed user.

5. The method of claim 4, wherein the nodes in the behavior graph network match corresponding initial information codes; and the determining the user behavior code of the to-be-pushed user in the behavior evaluation dimensions based on the behavior graph network of the to-be-pushed user comprises:

inputting the initial information codes of the nodes in the behavior graph network of the to-be-pushed user into a pre-trained information embedding network model to obtain the user behavior code of the to-be-pushed user in the behavior evaluation dimensions, wherein the pre-trained information embedding network model is configured to obtain the user behavior code of the to-be-pushed user in the behavior evaluation dimensions based on aggregating target information codes of neighbor nodes of the node in which the to-be-pushed user is located, and concatenating a target information code of the neighbor node of the node in which the to-be-pushed user is located obtained after the aggregation and the initial information code of the node in which the to-be-pushed user is located, and wherein the target information code of the neighbor node of the node in which the to-be-pushed user is located being obtained by aggregating target information codes of neighbor nodes of the neighbor node and concatenating a target information code of the neighbor node of the node in which the to-be-pushed user is located obtained after the aggregation and the initial information code of the neighbor node of the node in which the to-be-pushed user is located.

6. The method of claim 5, wherein the determining the recommendation probability of the to-be-pushed content based on the target code comprises:

inputting the target code into a pre-trained content recommendation model, and performing convolution pooling processing on the target code by using the pre-trained content recommendation model, to obtain the recommendation probability of the to-be-pushed content.

7. The method of claim 6, wherein training the pre-trained information embedding network model and the pre-trained content recommendation model comprises:

obtaining data of a sample user in the behavior evaluation dimensions, sample user portrait information, sample push content, and an actual recommendation probability of the sample push content;

respectively inputting the sample user portrait information and the sample push content into a feature extraction network in a to-be-trained content recommendation model, to obtain a sample user portrait code corresponding to the sample user portrait information and a sample push content code corresponding to the sample push content;

inputting the data of the sample user in the behavior evaluation dimensions into a to-be-trained information embedding network model, to obtain a sample user behavior code of the sample user in the behavior evaluation dimensions;

fusing the sample push content code with the sample user behavior code and the sample user portrait code to obtain a sample target code;

inputting the sample target code into a content prediction network in the to-be-trained content recommendation model to obtain a predicted recommendation probability of the sample push content;

calculating a loss value based on the predicted recommendation probability and the actual recommendation probability;

adjusting network parameters of the to-be-trained information embedding network model and the to-be-trained content recommendation model based on the loss value, until a training end condition is met to obtain a current information embedding network model and a current content recommendation model respectively; and using the current content recommendation model as the pre-trained content recommendation model based on the training end condition being met, and using the current information embedding network model as the pre-trained information embedding network model.

8. The method of claim 1, wherein the determining the push content corresponding to the to-be-pushed user from the to-be-pushed content based on the recommendation probability comprises:
determining the to-be-pushed content with the recommendation probability greater than a preset threshold as the push content corresponding to the to-be-pushed user.

9. The method of claim 1, wherein the fusing the to-be-pushed content code with the user behavior code and the user portrait code to obtain the target code comprises:
obtaining a first preset weight corresponding to the to-be-pushed content code, a second preset weight corresponding to the user behavior code, and a third preset weight corresponding to the user portrait code;
weighting the to-be-pushed content code, the user behavior code, and the user portrait code respectively based on the first present weight, the second preset weight, and the third preset weight, to obtain a weighted to-be-pushed content code, a weighted user behavior code, and a weighted user portrait code; and
fusing the weighted to-be-pushed content code with the weighted user behavior code and the weighted user portrait code to obtain the target code.

10. The method of claim 1, wherein the data of the to-be-pushed user in the behavior evaluation dimensions is the data of the to-be-pushed user in the behavior evaluation dimensions in a current period of time, and the method further comprises:
obtaining data of the to-be-pushed user in the behavior evaluation dimensions in a next period of time; and
the determining the user behavior code of the to-be-pushed user in the behavior evaluation dimensions based on the data of the to-be-pushed user in the behavior evaluation dimensions comprises:
updating the data of the to-be-pushed user in the behavior evaluation dimensions in the current period of time based on the data of the to-be-pushed user in the behavior evaluation dimensions in the next period of time to obtain the updated data; and
updating the user behavior code of the to-be-pushed user in the behavior evaluation dimensions based on the updated data.

11. An apparatus for content processing, the apparatus comprising:
at least one memory configured to store program code; and
at least one processor configured to read the program code and operate as instructed by the program code, the program code comprising:
first obtaining code configured to cause the at least one processor to obtain data of a to-be-pushed user in behavior evaluation dimensions, user portrait information of the to-be-pushed user, and to-be-pushed content, the user portrait information matching a corresponding user portrait code, and the to-be-pushed content matching a corresponding to-be-pushed content code;
first determining code configured to cause the at least one processor to determine a user behavior code of the to-be-pushed user in the behavior evaluation dimensions based on the data of the to-be-pushed user in the behavior evaluation dimensions;
first fusing code configured to cause the at least one processor to obtain a target code based on the to-be-pushed content code, the user behavior code, and the user portrait code;
second determining code configured to cause the at least one processor to determine a recommendation probability of the to-be-pushed content based on the target code; and
third determining code configured to cause the at least one processor to determine push content corresponding to the to-be-pushed user from the to-be-pushed content based on the recommendation probability,
wherein the behavior evaluation dimensions comprise a first behavior evaluation dimension and a second behavior evaluation dimension,
wherein the first behavior evaluation dimension uses a first relationship between the to-be-pushed user and the push content in a preset period of time, and
wherein the second behavior evaluation dimension uses a second relationship between the to-be-pushed user and a publishing object of the push content in the preset period of time.

12. The apparatus of claim 11, wherein the first obtaining code comprises:
first acquiring code configured to cause the at least one processor to acquire operation data of the to-be-pushed user on the push content in the preset period of time, association data between the to-be-pushed user and the publishing object of the push content in the preset period of time, and operation data of the publishing object on the push content in the preset period of time; and
second obtaining code configured to cause the at least one processor to obtain data of the to-be-pushed user in the behavior evaluation dimensions in the preset period of time based on the operation data of the to-be-pushed user on the push content in the preset period of time, the association data between the to-be-pushed user and the publishing object of the push content in the preset period of time, and the operation data of the publishing object on the push content in the preset period of time.

13. The apparatus of claim 12, wherein the behavior evaluation dimensions further comprises a third behavior evaluation dimension; and
the second obtaining code further comprises:
third obtaining code configured to cause the at least one processor to obtain the first relationship between the to-be-pushed user and the push content based on the operation data of the to-be-pushed user on the push content in the preset period of time, and using the first relationship between the to-be-pushed user and the push content as data of the to-be-pushed user in the first behavior evaluation dimension;
forth obtaining code configured to cause the at least one processor to obtain the second relationship between the to-be-pushed user and the publishing object based on the association data between the to-be-pushed user and the publishing object of the push content in the preset period of time, and using the second relationship between the to-be-pushed user and the publishing object as data of the to-be-pushed user in the second behavior evaluation dimension; and
fifth obtaining code configured to cause the at least one processor to obtain a third relationship between the publishing object and the push content based on the operation data of the publishing object on the push content in the preset period of time, and using the third relationship between the publishing object and the push content as data of the to-be-pushed user in the third behavior evaluation dimension.

14. The apparatus of claim 11, wherein the data of the to-be-pushed user in the behavior evaluation dimensions comprises data objects and data relationships between the data objects; and The first determining code comprises:
fourth constructing code configured to cause the at least one processor to construct a behavior graph network of the to-be-pushed user by using the data objects as nodes and the data relationships between the data objects as edges of the nodes; and
fourth determining code configured to cause the at least one processor to determine the user behavior code of the to-be-pushed user in the behavior evaluation dimensions based on the behavior graph network of the to-be-pushed user.

15. The apparatus of claim 14, wherein the nodes in the behavior graph network match corresponding initial information codes; and
the fourth determining code further comprises:
sixth obtaining code configured to cause the at least one processor to input the initial information codes of the nodes in the behavior graph network of the to-be-pushed user into a pre-trained information embedding network model to obtain the user behavior code of the to-be-pushed user in the behavior evaluation dimensions,
wherein the pre-trained information embedding network model is configured to obtain the user behavior code of the to-be-pushed user in the behavior evaluation dimensions based on aggregating target information codes of neighbor nodes of the node in which the to-be-pushed user is located, and concatenating a target information code of the neighbor node of the node in which the to-be-pushed user is located obtained after the aggregation and the initial information code of the node in which the to-be-pushed user is located, and
wherein the target information code of the neighbor node of the node in which the to-be-pushed user is located being obtained by aggregating target information codes of neighbor nodes of the neighbor node and concatenating a target information code of the neighbor node of the node in which the to-be-pushed user is located obtained after the aggregation and the initial information code of the neighbor node of the node in which the to-be-pushed user is located.

16. The apparatus of claim 15, the second determining code further comprises seventh obtaining code configured to cause the at least one processor to obtain the recommendation probability of the to-be-pushed content based on inputting the target code into a pre-trained content recommendation model, and performing convolution pooling processing on the target code by using the pre-trained content recommendation model.

17. The apparatus of claim 11, wherein the third determining code further comprises fifth determining code configured to cause the at least one processor to determine the to-be-pushed content with the recommendation probability greater than a preset threshold as the push content corresponding to the to-be-pushed user.

18. The apparatus of claim 11, wherein the first fusing code further comprises:

eighth obtaining code configured to cause the at least one processor to obtain a first preset weight corresponding to the to-be-pushed content code, a second preset weight corresponding to the user behavior code, and a third preset weight corresponding to the user portrait code;
first weighting code configured to cause the at least one processor to weight the to-be-pushed content code, the user behavior code, and the user portrait code respectively first present weight, the second preset weight, and the third preset weight, to obtain a weighted to-be-pushed content code, a weighted user behavior code, and a weighted user portrait code; and
second fusing code configured to cause the at least one processor to fuse the weighted to-be-pushed content code with the weighted user behavior code and the weighted user portrait code to obtain the target code.

19. The apparatus of claim 11, wherein the data of the to-be-pushed user in the behavior evaluation dimensions is the data of the to-be-pushed user in the behavior evaluation dimensions in a current period of time, and the program code further comprises:
ninth obtaining code configured to cause the at least one processor to obtain data of the to-be-pushed user in the behavior evaluation dimensions in a next period of time; and
the first determining code further comprises:
first updating code configured to cause the at least one processor to update the data of the to-be-pushed user in the behavior evaluation dimensions in the current period of time based on the data of the to-be-pushed user in the behavior evaluation dimensions in the next period of time to obtain the updated data; and
second updating code configured to cause the at least one processor to update the user behavior code of the to-be-pushed user in the behavior evaluation dimensions based on the updated data.

20. A non-transitory computer-readable storage medium, storing at least one instruction executable by a processor to:
obtain data of a to-be-pushed user in behavior evaluation dimensions, user portrait information of the to-be-pushed user, and to-be-pushed content, wherein the user portrait information matches a corresponding user portrait code, and the to-be-pushed content matches a corresponding to-be-pushed content code;
determine a user behavior code of the to-be-pushed user in the behavior evaluation dimensions based on the data of the to-be-pushed user in the behavior evaluation dimensions;
obtain a target code based on the to-be-pushed content code, the user behavior code, and the user portrait code;
determine a recommendation probability of the to-be-pushed content based on the target code; and
determine push content corresponding to the to-be-pushed user from the to-be-pushed content based on the recommendation probability,
wherein the behavior evaluation dimensions comprise a first behavior evaluation dimension and a second behavior evaluation dimension,
wherein the first behavior evaluation dimension uses a first relationship between the to-be-pushed user and the push content in a preset period of time; and
wherein the second behavior evaluation dimension uses a second relationship between the to-be-pushed user and a publishing object of the push content in the preset period of time.

* * * * *